(12) United States Patent
Martinez et al.

(10) Patent No.: US 10,880,189 B2
(45) Date of Patent: Dec. 29, 2020

(54) SYSTEM AND METHOD FOR A CLOUD COMPUTING ABSTRACTION WITH SELF-SERVICE PORTAL FOR PUBLISHING RESOURCES

(71) Applicant: CSC Agility Platform, Inc., Falls Church, VA (US)

(72) Inventors: Frank Martinez, La Canada, CA (US); Eric Pulier, Los Angeles, CA (US)

(73) Assignee: CSC Agility Platform, Inc., Falls Church, VA (US)

( * ) Notice: Subject to any disclaimer, the term of this patent is extended or adjusted under 35 U.S.C. 154(b) by 546 days.

(21) Appl. No.: 15/288,936

(22) Filed: Oct. 7, 2016

(65) Prior Publication Data

US 2017/0126787 A1 May 4, 2017

Related U.S. Application Data

(63) Continuation of application No. 13/842,413, filed on Mar. 15, 2013, now Pat. No. 9,489,647, which is a
(Continued)

(51) Int. Cl.
*H04L 12/24* (2006.01)
*H04L 29/06* (2006.01)
(Continued)

(52) U.S. Cl.
CPC ............ *H04L 41/5077* (2013.01); *G06F 8/36* (2013.01); *G06Q 10/06* (2013.01);
(Continued)

(58) Field of Classification Search
CPC . H04L 41/5077; H04L 41/5096; H04L 63/02; H04L 67/10; G06F 8/36; G06Q 10/06
See application file for complete search history.

(56) References Cited

U.S. PATENT DOCUMENTS

| | | | |
|---|---|---|---|
| 6,012,053 A | 1/2000 | Pant et al. | |
| 6,182,226 B1 | 1/2001 | Reid | |

(Continued)

FOREIGN PATENT DOCUMENTS

| | | |
|---|---|---|
| WO | 9858356 | 12/1998 |
| WO | 2004012038 | 2/2004 |

(Continued)

OTHER PUBLICATIONS

European Patent Application No. EP14764916.4, Examination Report dated Dec. 8, 2017.
(Continued)

*Primary Examiner* — Sujay Koneru
(74) *Attorney, Agent, or Firm* — Sheppard Mullin Richter & Hampton LLP

(57) ABSTRACT

In embodiments of the present invention, improved capabilities are described for a virtualization environment adapted for development and deployment of at least one software workload, the virtualization environment having a metamodel framework that allows the association of a policy to the software workload upon development of the workload that is applied upon deployment of the software workload.

17 Claims, 21 Drawing Sheets

Related U.S. Application Data continuation-in-part of application No. 13/354,275, filed on Jan. 19, 2012, now Pat. No. 9,069,599, which is a continuation-in-part of application No. 13/009,774, filed on Jan. 19, 2011, now Pat. No. 8,931,038, which is a continuation-in-part of application No. 12/488,424, filed on Jun. 19, 2009, now Pat. No. 8,514,868.

(60) Provisional application No. 61/434,396, filed on Jan. 19, 2011, provisional application No. 61/296,405, filed on Jan. 19, 2010, provisional application No. 61/074,027, filed on Jun. 19, 2008.

(51) Int. Cl.
 H04L 29/08 (2006.01)
 G06F 8/36 (2018.01)
 G06Q 10/06 (2012.01)

(52) U.S. Cl.
 CPC .......... H04L 41/5096 (2013.01); H04L 63/02 (2013.01); H04L 67/10 (2013.01)

(56) References Cited

U.S. PATENT DOCUMENTS

| | | |
|---|---|---|
| 6,321,334 B1 | 11/2001 | Jerger et al. |
| 6,345,361 B1 | 2/2002 | Jerger et al. |
| 6,473,800 B1 | 10/2002 | Jerger et al. |
| 6,747,598 B2 | 6/2004 | Bajikar |
| 6,847,970 B2 | 1/2005 | Keller et al. |
| 6,850,988 B1* | 2/2005 | Reed ............... G06Q 10/06 709/238 |
| 6,880,002 B2 | 4/2005 | Hirschfeld et al. |
| 6,996,716 B1 | 2/2006 | Hsu |
| 7,003,562 B2 | 2/2006 | Mayer |
| 7,143,439 B2 | 11/2006 | Cooper et al. |
| 7,272,646 B2 | 9/2007 | Cooper et al. |
| 7,284,267 B1 | 10/2007 | McArdle et al. |
| 7,376,965 B2 | 5/2008 | Jemes et al. |
| 7,428,754 B2 | 9/2008 | Neumann et al. |
| 7,506,357 B1 | 3/2009 | Moriconi et al. |
| 7,584,301 B1 | 9/2009 | Joshi |
| 7,613,826 B2 | 11/2009 | Guichard et al. |
| 7,620,613 B1 | 11/2009 | Moore et al. |
| 7,685,261 B1 | 3/2010 | Marinelli et al. |
| 7,697,441 B2 | 4/2010 | Bansal et al. |
| 7,698,230 B1 | 4/2010 | Brown et al. |
| 7,698,430 B2 | 4/2010 | Jackson |
| 7,773,598 B2 | 8/2010 | Lindhom et al. |
| 7,774,444 B1 | 8/2010 | George et al. |
| 7,836,198 B2 | 11/2010 | Cadigan et al. |
| 7,886,031 B1 | 2/2011 | Taylor et al. |
| 8,019,849 B1 | 9/2011 | Lopilato et al. |
| 8,060,630 B1 | 11/2011 | Jancaitis et al. |
| 8,078,728 B1 | 12/2011 | Pollan et al. |
| 8,082,262 B2 | 12/2011 | Farber et al. |
| 8,117,289 B1 | 2/2012 | Miller et al. |
| 8,135,815 B2 | 3/2012 | Mayer |
| 8,230,050 B1 | 7/2012 | Brandwine et al. |
| 8,255,932 B1 | 8/2012 | Clemm et al. |
| 8,259,571 B1 | 9/2012 | Raphel et al. |
| 8,261,295 B1 | 9/2012 | Risbood et al. |
| 8,266,254 B2 | 9/2012 | Garrison |
| 8,369,333 B2 | 2/2013 | Hao et al. |
| 8,434,080 B2 | 4/2013 | Yendluri |
| 8,443,069 B2 | 5/2013 | Bagepalli et al. |
| 8,448,170 B2 | 5/2013 | Wipfel et al. |
| 8,468,256 B1 | 6/2013 | McArdle et al. |
| 8,473,557 B2 | 6/2013 | Ramakrishnan et al. |
| 8,510,835 B1 | 8/2013 | Bucu et al. |
| 8,543,810 B1 | 9/2013 | Angal et al. |
| 8,782,637 B2 | 7/2014 | Khalid |
| 8,984,610 B2 | 3/2015 | Spiers et al. |
| 9,015,324 B2 | 4/2015 | Jackson |
| 2002/0010572 A1 | 1/2002 | Orton et al. |
| 2002/0016926 A1 | 2/2002 | Nguyen et al. |
| 2002/0099823 A1 | 7/2002 | Jemes et al. |
| 2002/0129128 A1 | 9/2002 | Gold et al. |
| 2002/0178246 A1 | 11/2002 | Mayer |
| 2002/0184525 A1 | 12/2002 | Cheng |
| 2003/0051021 A1 | 3/2003 | Hirschfeld et al. |
| 2003/0051201 A1 | 3/2003 | Brenna |
| 2003/0093465 A1 | 5/2003 | Banerjee et al. |
| 2003/0105810 A1 | 6/2003 | McCrory et al. |
| 2003/0112182 A1 | 6/2003 | Bajikar |
| 2003/0177176 A1 | 9/2003 | Hirschfeld et al. |
| 2003/0177390 A1 | 9/2003 | Radhakrishnan et al. |
| 2003/0182389 A1 | 9/2003 | Edwards |
| 2003/0184474 A1 | 10/2003 | Bajikar |
| 2003/0229808 A1 | 12/2003 | Heintz et al. |
| 2004/0083295 A1 | 4/2004 | Amara et al. |
| 2004/0111643 A1 | 6/2004 | Farmer |
| 2004/0210623 A1 | 10/2004 | Hydrie et al. |
| 2005/0002516 A1 | 1/2005 | Shtivelman |
| 2005/0075842 A1 | 4/2005 | Ormazabal et al. |
| 2005/0091098 A1 | 4/2005 | Brodersen et al. |
| 2005/0091353 A1 | 4/2005 | Gopisetty et al. |
| 2005/0149471 A1 | 7/2005 | Lassalle |
| 2005/0193196 A1 | 9/2005 | Huang et al. |
| 2005/0198125 A1 | 9/2005 | Beck et al. |
| 2005/0198299 A1 | 9/2005 | Beck et al. |
| 2005/0257244 A1 | 11/2005 | Joly et al. |
| 2005/0283823 A1 | 12/2005 | Okajo et al. |
| 2005/0289538 A1 | 12/2005 | Black-Ziegelbein et al. |
| 2006/0005162 A1 | 1/2006 | Tseng et al. |
| 2006/0010492 A9 | 1/2006 | Heintz et al. |
| 2006/0026123 A1 | 2/2006 | Moore et al. |
| 2006/0041936 A1 | 2/2006 | Anderson et al. |
| 2006/0133338 A1 | 2/2006 | Reznik et al. |
| 2006/0056297 A1 | 3/2006 | Bryson et al. |
| 2006/0059548 A1 | 3/2006 | Hildre et al. |
| 2006/0100912 A1 | 5/2006 | Kumar et al. |
| 2006/0129670 A1 | 6/2006 | Mayer |
| 2006/0129672 A1 | 6/2006 | Mayer |
| 2006/0159116 A1 | 7/2006 | Gerszberg et al. |
| 2006/0212334 A1 | 9/2006 | Jackson |
| 2006/0253443 A1 | 11/2006 | Li et al. |
| 2006/0282294 A1 | 12/2006 | McComb et al. |
| 2006/0282295 A1 | 12/2006 | McComb et al. |
| 2007/0011291 A1 | 1/2007 | Mi |
| 2007/0011723 A1 | 1/2007 | Chao |
| 2007/0022474 A1 | 1/2007 | Rowett et al. |
| 2007/0022479 A1 | 1/2007 | Sikdar et al. |
| 2007/0061870 A1 | 3/2007 | Ting et al. |
| 2007/0157286 A1 | 7/2007 | Singh et al. |
| 2007/0180448 A1 | 8/2007 | Low |
| 2007/0180449 A1 | 8/2007 | Croft et al. |
| 2007/0240102 A1 | 10/2007 | Bello et al. |
| 2008/0034365 A1 | 2/2008 | Dahlstedt |
| 2008/0072284 A1 | 3/2008 | Horvitz et al. |
| 2008/0082693 A1 | 4/2008 | Meijer |
| 2008/0215681 A1 | 9/2008 | Darcie et al. |
| 2008/0253322 A1 | 10/2008 | So et al. |
| 2008/0306798 A1 | 12/2008 | Anke et al. |
| 2009/0036111 A1 | 2/2009 | Danford et al. |
| 2009/0063415 A1 | 3/2009 | Chatfield et al. |
| 2009/0063665 A1 | 3/2009 | Bagepalli et al. |
| 2009/0085743 A1 | 4/2009 | Ravi et al. |
| 2009/0089078 A1 | 4/2009 | Bursey |
| 2009/0126999 A1 | 5/2009 | Davidson |
| 2009/0138600 A1 | 5/2009 | Baum et al. |
| 2009/0138795 A1 | 5/2009 | Liu et al. |
| 2009/0138938 A1 | 5/2009 | Harrison et al. |
| 2009/0138958 A1 | 5/2009 | Baum et al. |
| 2009/0158302 A1 | 6/2009 | Nicodemus |
| 2009/0178108 A1 | 7/2009 | Hudis et al. |
| 2009/0187927 A1 | 7/2009 | Wang et al. |
| 2009/0204795 A1 | 8/2009 | Nasuto |
| 2009/0210929 A1 | 8/2009 | Zill et al. |
| 2009/0216999 A1 | 8/2009 | Gebhart et al. |
| 2009/0228950 A1 | 9/2009 | Reed et al. |
| 2009/0228967 A1 | 9/2009 | Gbadegesin |

(56) References Cited

U.S. PATENT DOCUMENTS

| | | |
|---|---|---|
| 2009/0240346 A1 | 9/2009 | Cadigan et al. |
| 2009/0265755 A1 | 10/2009 | Hamilton, II et al. |
| 2009/0271324 A1* | 10/2009 | Jandhyala ........ G06Q 10/06375 705/80 |
| 2009/0276771 A1 | 11/2009 | Nickolov et al. |
| 2009/0300151 A1 | 12/2009 | Friedman et al. |
| 2009/0300169 A1 | 12/2009 | Sagar et al. |
| 2009/0300210 A1 | 12/2009 | Ferris |
| 2009/0300635 A1* | 12/2009 | Ferris .................... G06F 9/5072 718/104 |
| 2009/0307685 A1 | 12/2009 | Axnix et al. |
| 2009/0313625 A1 | 12/2009 | Sharoff |
| 2010/0027552 A1 | 2/2010 | Hill |
| 2010/0050239 A1 | 2/2010 | Carter et al. |
| 2010/0058435 A1 | 3/2010 | Buss et al. |
| 2010/0071024 A1 | 3/2010 | Eyada |
| 2010/0106478 A1* | 4/2010 | Barnett .................. G06Q 10/04 703/17 |
| 2010/0169497 A1 | 7/2010 | Klimentiev et al. |
| 2010/0198972 A1 | 8/2010 | Umbehocker |
| 2010/0205061 A1 | 8/2010 | Karmarkar |
| 2010/0212010 A1 | 8/2010 | Stringer et al. |
| 2010/0223385 A1 | 9/2010 | Gulley et al. |
| 2010/0250497 A1 | 9/2010 | Redlich et al. |
| 2010/0275241 A1 | 10/2010 | Srinivasan |
| 2010/0287280 A1 | 11/2010 | Sivan |
| 2010/0293484 A1 | 11/2010 | Stanhope et al. |
| 2010/0293522 A1 | 11/2010 | Cifra et al. |
| 2010/0306773 A1 | 12/2010 | Lee et al. |
| 2010/0318609 A1 | 12/2010 | Lahiri et al. |
| 2010/0319004 A1 | 12/2010 | Hudson et al. |
| 2010/0332617 A1 | 12/2010 | Goodwin et al. |
| 2011/0004916 A1 | 1/2011 | Schiffman et al. |
| 2011/0016214 A1 | 1/2011 | Jackson |
| 2011/0016473 A1 | 1/2011 | Srinivasan |
| 2011/0075664 A1 | 3/2011 | Lambeth et al. |
| 2011/0083167 A1 | 4/2011 | Carpenter et al. |
| 2011/0099126 A1 | 4/2011 | Belani et al. |
| 2011/0125894 A1 | 5/2011 | Anderson et al. |
| 2011/0125895 A1 | 5/2011 | Anderson et al. |
| 2011/0126047 A1 | 5/2011 | Anderson et al. |
| 2011/0126099 A1 | 5/2011 | Anderson et al. |
| 2011/0126197 A1 | 5/2011 | Larsen et al. |
| 2011/0126207 A1 | 5/2011 | Wipfel et al. |
| 2011/0126275 A1 | 5/2011 | Anderson et al. |
| 2011/0138047 A1* | 6/2011 | Brown .................... G06Q 10/10 709/226 |
| 2011/0138442 A1 | 6/2011 | Vinberg et al. |
| 2011/0153727 A1 | 6/2011 | Li |
| 2011/0154350 A1 | 6/2011 | Doyle et al. |
| 2011/0161915 A1 | 6/2011 | Srinivasamoorthy et al. |
| 2011/0213869 A1 | 9/2011 | Korsunsky et al. |
| 2011/0214157 A1 | 9/2011 | Korsunsky et al. |
| 2011/0219035 A1 | 9/2011 | Korsunsky et al. |
| 2011/0231510 A1 | 9/2011 | Korsunsky et al. |
| 2011/0231552 A1 | 9/2011 | Carter et al. |
| 2011/0231564 A1 | 9/2011 | Korsunsky et al. |
| 2011/0231899 A1 | 9/2011 | Pulier et al. |
| 2011/0238855 A1 | 9/2011 | Korsunsky et al. |
| 2011/0258692 A1 | 10/2011 | Morrison et al. |
| 2011/0261828 A1 | 10/2011 | Smith |
| 2011/0277026 A1 | 11/2011 | Agarwal et al. |
| 2011/0277027 A1 | 11/2011 | Hayton et al. |
| 2011/0314466 A1* | 12/2011 | Berg .................... G06F 9/5072 718/1 |
| 2012/0005236 A1 | 1/2012 | Deng et al. |
| 2012/0005724 A1 | 1/2012 | Lee |
| 2012/0042168 A1 | 2/2012 | Yuan et al. |
| 2012/0060142 A1* | 3/2012 | Fliess ..................... G06F 8/70 717/102 |
| 2012/0066487 A1 | 3/2012 | Brown et al. |
| 2012/0078643 A1 | 3/2012 | Nagpal et al. |
| 2012/0084184 A1 | 4/2012 | Raleigh et al. |
| 2012/0084189 A1* | 4/2012 | Schmitt .................. G06Q 30/00 705/35 |
| 2012/0110155 A1 | 5/2012 | Adlung et al. |
| 2012/0110588 A1 | 5/2012 | Bieswanger et al. |
| 2012/0158578 A1* | 6/2012 | Sedayao ................. G06F 21/10 705/39 |
| 2012/0163388 A1 | 6/2012 | Goel et al. |
| 2012/0173709 A1 | 7/2012 | Li et al. |
| 2012/0173728 A1 | 7/2012 | Haskins et al. |
| 2012/0179824 A1* | 7/2012 | Jackson ................. G06F 9/5027 709/226 |
| 2012/0185821 A1 | 7/2012 | Yaseen et al. |
| 2012/0185913 A1 | 7/2012 | Martinez et al. |
| 2012/0192146 A1 | 7/2012 | Arnold et al. |
| 2012/0221454 A1* | 8/2012 | Morgan ................. G06F 9/5027 705/37 |
| 2012/0226587 A1* | 9/2012 | de Lara ................. G06Q 30/06 705/27.1 |
| 2012/0229499 A1 | 9/2012 | Tsao et al. |
| 2012/0239739 A1 | 9/2012 | Manglik et al. |
| 2012/0239825 A1* | 9/2012 | Xia ..................... G06F 9/44505 709/250 |
| 2012/0240185 A1 | 9/2012 | Kapoor et al. |
| 2012/0246740 A1 | 9/2012 | Brooker et al. |
| 2012/0281706 A1 | 11/2012 | Agarwal et al. |
| 2012/0281708 A1 | 11/2012 | Chauhan et al. |
| 2012/0290460 A1* | 11/2012 | Curry, Jr. ............ H04L 41/5029 705/37 |
| 2012/0324069 A1 | 12/2012 | Nori et al. |
| 2013/0013377 A1* | 1/2013 | Kruglick ................. G06Q 30/04 705/7.36 |
| 2013/0019277 A1 | 1/2013 | Chang et al. |
| 2013/0031028 A1* | 1/2013 | Martin .................. G06Q 30/08 705/400 |
| 2013/0066940 A1 | 3/2013 | Shao |
| 2013/0067225 A1 | 3/2013 | Shochet et al. |
| 2013/0110967 A1 | 5/2013 | Ueoka et al. |
| 2013/0117157 A1* | 5/2013 | Iyoob ..................... G06Q 30/06 705/26.41 |
| 2013/0156189 A1 | 6/2013 | Gero et al. |
| 2013/0219456 A1 | 8/2013 | Sharma et al. |
| 2013/0232463 A1 | 9/2013 | Nagaraja et al. |
| 2013/0232470 A1 | 9/2013 | Yung |
| 2013/0263209 A1 | 10/2013 | Panuganty |
| 2013/0318341 A1 | 11/2013 | Bagepalli et al. |
| 2014/0033268 A1 | 1/2014 | Julisch et al. |
| 2014/0040975 A1 | 2/2014 | Raleigh et al. |
| 2014/0052877 A1 | 2/2014 | Mao |
| 2014/0059178 A1 | 2/2014 | Dutta et al. |
| 2014/0068743 A1* | 3/2014 | Marcus .................. G06F 21/33 726/8 |
| 2014/0074540 A1* | 3/2014 | Evans ................. H04L 41/5041 705/7.25 |
| 2014/0108665 A1 | 4/2014 | Arora et al. |
| 2014/0230011 A1 | 8/2014 | Drewry et al. |
| 2014/0236745 A1 | 8/2014 | Vautour |
| 2014/0245423 A1 | 8/2014 | Lee |
| 2014/0279201 A1 | 9/2014 | Iyoob |
| 2014/0280595 A1* | 9/2014 | Mani .................... H04L 12/1827 709/204 |
| 2014/0282821 A1 | 9/2014 | Adler et al. |
| 2014/0289391 A1* | 9/2014 | Balaji .................... H04L 43/04 709/224 |
| 2015/0012864 A1 | 1/2015 | Goodwin et al. |
| 2015/0058459 A1* | 2/2015 | Amendjian ......... H04L 41/5058 709/223 |
| 2015/0067677 A1 | 3/2015 | Naseh et al. |
| 2015/0067783 A1 | 3/2015 | Puller et al. |
| 2015/0172913 A1* | 6/2015 | DeCusatis .............. H04L 67/10 709/217 |
| 2015/0178699 A1* | 6/2015 | Wada .................... G06Q 30/04 705/40 |
| 2015/0206207 A1 | 7/2015 | Narasimhan et al. |
| 2015/0261887 A1 | 9/2015 | Joukov |
| 2015/0319050 A1 | 11/2015 | Kasturi et al. |
| 2015/0372982 A1 | 12/2015 | Herle et al. |
| 2015/0381425 A1 | 12/2015 | Kansai et al. |
| 2016/0119357 A1 | 4/2016 | Kinsella et al. |

(56) References Cited

U.S. PATENT DOCUMENTS

| | | | |
|---|---|---|---|
| 2016/0381151 A1* | 12/2016 | Apte | H04L 67/16 709/202 |
| 2017/0289169 A1 | 10/2017 | Plichta et al. | |
| 2018/0095997 A1 | 4/2018 | Beveridge et al. | |
| 2018/0234459 A1 | 8/2018 | Kung et al. | |
| 2019/0104144 A1 | 4/2019 | Robertson et al. | |

FOREIGN PATENT DOCUMENTS

| WO | 2009155574 | 12/2009 |
|---|---|---|
| WO | 2011091056 | 7/2011 |
| WO | 2012069064 | 5/2012 |

OTHER PUBLICATIONS

Mellor, Ewan et al., "Xen Management API," Version: API Revision 1.0.0, Apr. 27, 2007.
Mellor, Ewan, "The Xen-API," Xen Summit, T.J. Watson Research Center, Apr. 18, 2007.
Qian, Ling et al., "Cloud Computing: An Overview," Proceedings of the 1st International Conference on Cloud Computing (CloudCom 2009), pp. 626-631, Dec. 1, 2009.
Wikimedia Foundation, Inc. "Enterprise Service Bus," Wikipedia online encyclopedia entry, May 29, 2008 [retrieved online at http://en.wikipedia.org/w/index.php?title=Enterprise_service_bus&oldid=215734396 on Oct. 17, 2014].
Wood, Timothy et al., "The Case for Enterprise-Ready Virtual Private Clouds," Jun. 19, 2009.
Wood, Timothy, "Improving Data Center Resource Management, Deployment, and Availability with Virtualization," Jun. 2009.
European Patent Application No. EP09767882.5, Extended Search Report dated Jul. 14, 2011.
European Patent Application No. EP14762867.1, Extended Search Report dated Oct. 17, 2016.
European Patent Application No. EP14764916.4, Extended Search Report dated Sep. 27, 2016.
International Application No. PCT/US2009/048052, International Search Report and Written Opinion dated Aug. 20, 2009.
International Application No. PCT/US2011/021741, International Search Report and Written Opinion dated May 13, 2011.
International Application No. PCT/US2012/021921, International Search Report and Written Opinion dated Jul. 30, 2012.
International Application No. PCT/US2014/030536, International Search Report and Written Opinion dated Aug. 18, 2014.
International Application No. PCT/US2014/030599, International Search Report and Written Opinion dated Aug. 28, 2014.
Singapore Patent Application No. 201009380-5, Written Opinion dated Mar. 28, 2012.
European Patent Application No. EP09767882.5, Examination Report dated Aug. 24, 2017.
European Patent Application No. EP09767882.5, Summons to Attend Oral Proceedings dated Feb. 1, 2019.
Celesti et al., An Approach to Enable Cloud Service Providers to Arrange IaaS, PaaS, and Saas Using External Virtualization Infrastructures, IEEE, 2011, 5 pages.
J. B. Yuan, Y. C. Lee and W. Wu, "Building an intelligent provisioning engine for IaaS cloud computing services", Proceedings of the 13th Asia-Pacific Network Operations and Management Symposium(APNOMS), (2011 ), pp. 1-6.
Munyaka et al., Cloud Computing Security, 2013, 20 pages.

* cited by examiner

PLANNER

| Assets | Appliance | View Options | Submission Options | Refresh | | | |
|---|---|---|---|---|---|---|---|
| Applications | | | | | | | |
| Workloads | Applications | | | | | | |
| Servers | Name | Alies | Keyword | Planning State | Assignes | Ref ID | Cloud Readiness Score |
| Summary | ▽☐ Xxxxxxx Blog Applications | Xxxxxxx Blog | Blog | Xxxxx | Xxxxx Xxx | NAR 12345ABC | |
| Governance | ⌀Xxxxx Xxxx | ⌀Xxxx Boig Engine | Xxxxx | Xxxxx | | | |
| Task Inbox | ○Xxxx | | Alies | Keyword | Planning State | Assignes | Ref ID | Cloud Readiness Score |
| Administration | ○Acid | Name | | | | | Xx Xxx Xx | X 29 |
| Score Config | ▽☐Xxxxxx | | | Xxxxx | | | | |
| Score Report | ⌀Xxxxx Xxxx | ⌀Xxxx Blog Engine | Alies | Keyword | Planning State | Assignes | Ref ID | Cloud Readiness Score |
| | ○Xxxx | | | | | Xxx Xxx | | Xxx |
| | ○Acid | | | | | | | |

Xxx Xxx Page 25

FIG. 9A

SYSTEM AND METHOD FOR A CLOUD COMPUTING ABSTRACTION WITH SELF-SERVICE PORTAL FOR PUBLISHING RESOURCES

CROSS-REFERENCE TO RELATED APPLICATIONS

This application is a continuation of U.S. patent application Ser. No. 13/842,413, filed Mar. 15, 2013, entitled "SYSTEM AND METHOD FOR A CLOUD COMPUTING ABSTRACTION WITH SELF-SERVICE PORTAL FOR PUBLISHING RESOURCES", which is a continuation-in-part of U.S. patent application Ser. No. 13/354,275, filed Jan. 19, 2012, issued as U.S. Pat. No. 9,069,599, entitled "SYSTEM AND METHOD FOR A CLOUD COMPUTING ABSTRACTION LAYER WITH SECURITY ZONE FACILITIES", which claims the benefit of U.S. Provisional Patent Application No. 61/434,396 filed Jan. 19, 2011, entitled "SYSTEM AND METHOD FOR CLOUD COMPUTING", and which is a continuation-in-part of U.S. patent application Ser. No. 13/009,774, filed Jan. 19, 2011, issued as U.S. Pat. No. 8,931,038, entitled "SYSTEM AND METHOD FOR A CLOUD COMPUTING ABSTRACTION LAYER", which claims the benefit of U.S. Provisional Patent App. No. 61/296,405 filed Jan. 19, 2010, entitled "ENTERPRISE CLOUD SYSTEM AND METHOD", and is a continuation-in-part of U.S. patent application Ser. No. 12/488,424, filed Jun. 19, 2009, issued as U.S. Pat. No. 8,514,868, entitled "CLOUD COMPUTING GATEWAY, CLOUD COMPUTING HYPERVISOR, AND METHODS FOR IMPLEMENTING SAME", which claims priority to U.S. Provisional Patent Application No. 61/074,027 filed Jun. 19, 2008 entitled "CLOUD COMPUTING GATEWAY AND CLOUD COMPUTING HYPERVISOR", each of which is hereby incorporated herein by reference in its entirety.

BACKGROUND

Field of the Disclosure

The present invention relates to the field of cloud computing, and more particularly, the invention relates to systems and methods for securing, controlling and managing cloud services, applications, platforms and infrastructure.

Companies have begun offering businesses a new cloud computing outsourcing option that promises reduced costs, improved availability, improved scalability, and reduced time to deploy new applications. These companies act as managed service providers that rent virtual computer, storage, and Internet connectivity services for variable periods on a pay-peruse basis from large pools of re-purposable, multi-tenant computing resources. Such cloud infrastructure providers include Amazon Web Services®, Amazon EC2®, GoGrid®, Joyent®, and Mosso®.

Many businesses, however, are currently unable to use cloud infrastructure because of a lack of security, control, and manageability of the computing capacity rented from the cloud infrastructure providers. These problems prevent such businesses from maximizing their use of cloud infrastructure, which includes virtual server instances, storage, and Internet bandwidth. Enterprises also have difficulty identifying what cloud resources they should use, and how they should use them, such that usage is consistent with the technical, operational, and business needs of the enterprise.

SUMMARY

According to various embodiments of the invention, systems and methods are provided for one or more cloud computing abstraction layers. Through various embodiments of the present invention, a user can plan cloud-computing services, build a cloud-computing service, publish the cloud-computing service for consumption by users, or run the cloud-computing service. Some embodiments of the present invention provide access to disparate public or private cloud-computing resources through a common interface. Additionally, some embodiments can apply governance uniformly over disparate public or private cloud-computing resources.

Some systems may, for example, enable: self-service access to cloud-computing resources by end-users, developers, and admins; automated services with respect to cloud-computing services comprising of one or more cloud-computing resources (e.g., management, building, configuration, publication, validation, and development and deployment of cloud-computing services); rapid provisioning (e.g., deployment, release, scheduling, control etc.) of cloud-computing resources within a cloud-computing service; governance control of cloud-computing resources within a cloud-computing service (e.g., application of security and non-security policies to cloud-computing resources), audit control of cloud-computing services; or secure access to cloud-computing services. Accordingly, embodiments of the present invention provide on-demand access by internal users, external users (e.g. customers, service partners), and developers to cloud-computing services, such as infrastructure-as-a-service (IaaS), platform-as-a-service (PaaS), and software-as-a-service (SaaS), provided from a governed federation of internal (private cloud) and external cloud (commercial cloud) service providers. Some such embodiments allow for rapid and dynamic deployment and scaling of cloud-computing services. A private cloud may comprise, for example, Eucalyptus Systems, VMWare vSphere®, or Microsoft® HyperV; and a public cloud may comprise, for example, Amazon EC2®, Amazon Web Services®, Terremark®, Sawis®, or GoGrid®.

According to one system of the invention, the system provides a cloud-computing service from a cloud-computing environment comprising a plurality of cloud-computing resources, the system comprising: a management module configured to manage a cloud-computing resource of the plurality of cloud-computing resources as a cloud-computing service, wherein the cloud-computing service performs a computer workload and the cloud-computing service comprises the cloud-computing resource; an adapter configured to connect to the cloud-computing resource to the system and translate a management instruction received from the management module (e.g., intermediate representation of a command from a client) into a cloud application program interface call for the cloud-computing resource (e.g. proprietary API call for Amazon EC2®); a cloud service bus configured to route the management instruction from the management module to the adapter; a consumption module configured to allow a user to subscribe the cloud-computing service; a planning module configured to plan the cloud-computing service; and a build module configured to build the cloud-computing service from the cloud-computing resource and publish the cloud-computing service to the consumption module. In some such embodiments, the system provides a user interface configured to provide access to the system as a virtual private cloud. The system may further comprise a cloud model utilized by the adapter to translate the management instruction to the (target) cloud API call.

In certain embodiments, the virtual private cloud is utilized for operation of a cloud-computing service in accordance with the present invention. In particular embodiments, a computer workload (e.g., application, server software, software development environment, software test environment) is a unit of computing processing that is performed via an IaaS, PaaS, or SaaS. For example, IaaS may comprise instances of Microsoft® Windows or Linux running on a virtual computer, or a Desktop-as-a-service (DaaS) provided by Citrix® or VMWare®; a PaaS may comprise a database server (e.g., MySQL® server), Samba server, Apache® server, Microsoft® IIS.NET server, Java® runtime, or Microsoft® .NET® runtime, Linux-Apache-MySQL-PHP (LAMP) server, Microsoft® Azure, or Google® AppsEngine; a SaaS may comprise SalesForce®, Google® Apps, or other software application that can be deployed as a cloud service, such as in a web services model. A cloud-computing resource may be a physical or virtual computing resource (e.g., virtual machine). In some embodiments, the cloud-computing resource is a storage resource (e.g., Storage Area Network (SAN), Network File System (NFS), or Amazon S3®), a network resource (e.g., firewall, load-balancer, or proxy server), an internal private resource, an external private resource, a secure public resource, an infrastructure-as-a-service (IaaS) resource, a platform-as-a-service (PaaS) resource, or a software-as-a-service (SaaS) resource. Hence, in some embodiments, a cloud-computing service provided may comprise a IaaS, PaaS, or SaaS provided by private or commercial (e.g., public) cloud service provider, such as Amazon Web Services®, Amazon EC2®, GoGrid®, Joyent®, Mosso®, or the like.

In various embodiments, the management module that manages the cloud-computing service comprises provisioning the cloud-computing service for a virtual private cloud, releasing the cloud-computing service for the virtual private cloud, accounting for usage of the cloud-computing service in the virtual private cloud, or monitoring the cloud-computing service. For example, in some embodiments, the management module manages cloud-computing resources for a cloud-computing service being offered by the system by provisioning a cloud-computing resource for the cloud-computing service, deploying a cloud-computing resource for the cloud-computing service, or releasing a cloud-computing resource being used by the cloud-computing service. In some embodiments, the provisioning involves starting, stopping, or generally controlling an instance of a cloud-computing resource (e.g., IaaS providing an instance of Linux) on behalf of a cloud-computing service. For example, an embodiment may launch scripts to start an instance of a cloud-computing resource, launch scripts to securely (e.g., via encryption) attach a file system (e.g., a storage volume) to the instantiation of the cloud-computing resource (e.g., so that the cloud-computing resource can access local or remote client data securely), and then connect a client to the instantiation through a virtual private network (VPN) connection between the client's local network and the cloud providers network.

In further embodiments, the management module is further configured to perform collection and maintenance of cost and consumption of various cloud-computing resources such as CPU-time, storage volume consumption, network I/O and other configurable cloud-computing cost and consumption factors. For example, in some embodiments where the management module accounts for usage of one more cloud-computing services by a client collecting, aggregating and providing this information through a API to customer billing systems while also presenting reporting through the consumption module demonstrating cost and consumption comparisons, projections and usage. Some embodiments may utilize Ariba®, SAP®, or the like to facilitate accounting and billing of usage of cloud-computing service.

In some embodiments, the build module allows a developer to create a cloud-computing service (e.g., IaaS, PaaS, and SaaS) comprising one or more cloud-computing resources. The build module may utilize build scripts to build a cloud-computing service from one or more cloud-computing resources, configure a cloud-computing service, or publish a cloud-computing service for consumption.

In various embodiments, a cloud-computing service may be published to a consumption module that allows an end-user to subscribe to the cloud-computing service and utilize the service. In some embodiment, the end-user may access and subscribe to the cloud-computing service through a user interface that lists published and available cloud-computing services. For example, the user interface may be a storefront through which an end-user may preview and select a cloud-computing service for use.

With some embodiments, an organization can determine the most suitable deployment of a computer workload to a cloud-computing environment, or determine the value/benefit of deploying a computer workload to a cloud-computing environment. For some embodiments, the planning module analyzes a computer workload or workflow that may have previously been on a physical or virtual computing resource and assists in migrating or importing the computer workload or workflow to the clouding-computing environment. In further embodiments, the planning module assesses difficulty in migrating or importing the computer workload or workflow, and the efficiency or value of using the cloud-computing environment. In other embodiments, the planning module determines the correct placement of a computer workload or workflow to an appropriate cloud-computing service based on the profile or characteristics of the computer workload (e.g., determine that the computer workload or workflow needs to be performed within secure cloud/public cloud/private cloud). For example, for a trading platform, which needs a low latency-computing environment that is secure, an embodiment may recommend placement of trading platform in a cloud-computing service comprising a be used for long-term storage of non-sensitive data, an embodiment may recommend configuration of the platform to use cloud-computing services comprising a public cloud resource, or a combination of cloud and physical resources, such as archival tape storage resources. Further, the placement decision is guided by policy that ensures the cloud-computing resource is placed in the appropriate cloud-computing service.

In particular embodiments, the system further comprises a policy engine module configured to enforce a policy on the cloud-computing service through the management module. For example, in some embodiments, the management module monitors a cloud-computing resource of the cloud-computing service through the adapter and provisions the cloud-computing resource according to the policy engine module. Additionally, for some embodiments, the management module monitors a cloud-computing resource's performance using Ganglia Monitoring System or collectd (an open source daemon that collects system performance statistics periodically).

In some embodiments, the system further comprises an identity management module configured to connect to an authentication system and authenticate the user for the cloud-computing service. For example, in some embodiments, the identity management connects to disparate authentication systems (e.g., Netegrity®, Oracle OAM®, Microsoft® Active Directory, RSA® Cleartrust, or Lightweight Directory Access Protocol (LDAP), Kerberos) to create a federated authentication system that allows unified authentication to a cloud-computing service.

In various embodiments, the system further comprises an encryption module configured to perform encryption services for the cloud-computing service. For example, the encryption services can include encryption of data on a storage device or data communicated over a network connection. In other embodiments, the system further comprises a connection module configure to securely connect the cloud-computing service to a client network or a cloud provider network. For example, a connection module may be deployed on a client network or a cloud provider network to facilitate a secure network connection between cloud-computing service and a client network.

According to some embodiments, a method is provided for a cloud-computing environment comprising a plurality of cloud-computing resources, the method comprising: providing a virtual private cloud configured to utilize a cloud-computing resource from the plurality of cloud-computing resources to perform a computer workload; receiving a request to perform the computer workload within the virtual private cloud, provisioning the cloud-computing resource from the plurality of cloud-computing resources; deploying the cloud-computing resource within the virtual private cloud; and using the cloud-computing resource to perform the computer workload.

As noted before, the cloud-computing resource may be a virtual (e.g., virtual machine) or physical cloud-computing resource (e.g., dedicated server). For example, the cloud-computing resource may be a virtual computing resource where the virtual computing resource is deployed under control of a virtual machine manager. The cloud-computing resource maybe a storage resource, a network resource, an internal private resource, an external private resource, a secure public resource, a platform-as-a-service (PaaS), a software-as-a-service (SaaS), or an infrastructure-as-a-service (IaaS). The cloud-computing resource may be a hybrid cloud-computing resource comprising at least two of a physical resource, a virtualized resource, a private resource, a public resource, an internal resource, or an external resource.

In some embodiments, the method further comprises receiving a constraint for the cloud-computing resource or for a computer workload that may be deployed on the cloud-computing resource, wherein the cloud-computing resource is a cloud-computing resource; and applying the constraint on the cloud-computing resource such that, when the cloud-computing resource is used to perform the computer workload, the cloud-computing resource's operation is limited according to the constraint. In other embodiments, the method further comprises declaring a static network address for the computer workload.

In some embodiments, the method further comprises: defining a security zone such that the security zone comprises the virtual private cloud; and applying a security policy to the security zone such that, when the cloud-computing resource deployed in the virtual private cloud that is used to perform the computer workload, the cloud-computing resource's operation or the performance or operation of the computer workload is subject to, the security policy. The security zone may be defined according to a physical location of the virtual private cloud's usage, a network location of the virtual private cloud's usage, or an attribute of an organization associated with the virtual private cloud. The security policy may be an access policy, a read-permission policy, a write-permission policy, an edit-permission policy, a privacy-based policy, a policy regarding a required level or type of encryption, a cloud-computing resource utilization policy, or other policy. The security policy can be configured to only allow software packages that comply with the security zone's policies to be deployed with the security zone. For example, a security zone may be defined as a specified virtual private network (VPN) or a specified physical network of a business enterprise, such that computer workloads being performed by a cloud-computing resource operating in that zone may be modified only by users who have specified authorization credentials issued by that enterprise. Among some embodiments, a security zone may be defined as cloud-computing resources (public or private) that are physically located in a geographical area, such as the United States, allowing a security policy to be applied that prohibits export of data that is to be associated with computer workloads executed in that security zone. In other embodiments, the policies are defined and implemented on the firewalls through a central policy server.

In additional embodiments, the method further comprises: receiving at a central policy server a definition for a security policy, wherein the central policy server is configured to associate the security policy to the computer workload or to the cloud-computing computing resource performing the computer workload; and pushing the security policy to the cloud-computing resource.

For some embodiments, provisioning the cloud-computing resource comprises: locating an unreserved cloud-computing resource within the plurality of cloud-computing resources; and reserving for the virtual private cloud the unreserved cloud-computing resource.

In embodiments where the cloud-computing resource is an infrastructure element, and the method further comprises: providing a user interface that allows a user to deploy or configure the infrastructure element; setting, through the user interface, a policy to the infrastructure element or to a computer workload that may be deployed on the infrastructure element; and applying the policy to the infrastructure element when the infrastructure element or computer workload is deployed within the virtual private cloud. The method further comprises: determining a reference design for the infrastructure element; and deploying the infrastructure element in the virtual private cloud according to the reference design.

In other embodiments, the method further comprises: associating a policy with the computer workload to be performed within the virtual private cloud; and applying the policy to the cloud-computing resource performing the computer workload during the computer workload's performance.

In additional embodiments, receiving the request to perform the computer workload or the application of the policy to the computer workload comprises: receiving an application to be migrated to cloud-computing environment for execution; and identifying the computer workload as necessary for executing the application.

In further embodiments, the method further comprises: using an adapter to connect the virtual private cloud to one or more other cloud-computing resources, such as of the types described herein; using a metamodel data structure to store an association between a computer workload and a policy; and pushing the metamodel data structure to the adapter such that, when the cloud-computing resource is deployed to perform the computer workload, the adapter applies the policy to the computer workload or to the cloud-computing resource performing the computer workload. In some such embodiments, when a computer workload is moved from using one cloud-computing resource to a second cloud-computing resource, the method may further comprise pushing the metamodel data structure to a second adapter that connects the second cloud-computing resource to the virtual private cloud such that when the second cloud-computing resource is deployed, such as within the virtual private cloud to perform the computer workload, the second adapter applies the policy to the second cloud-computing resource performing the cloud computer workload.

In other embodiments, the method comprises identifying the cloud-computing resource for performing the computer workload. Identifying the cloud-computing resource may be based on a computer workload score determined by a scoring logic. The scoring logic maybe, for example, based on a business attribute of the computer workload, a technical attribute of the computer workload, or an operational attribute of the computer workload. In further embodiments, the scoring logic uses a mix of at least two of a business attribute, an operational attribute and a technical attribute. In various embodiments, the scoring logic may be editable or may be dynamically updated at or near real-time.

In some embodiments, the computer workload may be scalable. For example, the computer workload maybe scaled down to decrease the computer workload's use of memory and processing time during performance within a virtual private cloud or actually increase or decrease the number of cloud-computing resources which execute the computer workload. In further embodiments, the scaling is based on a policy, which may be associated with the computer workload, stored in a metamodel, and pushed via an adaptor to or among various cloud computing resources.

In some embodiments, deploying the cloud-computing resource comprises deploying a pre-determined set of cloud-computing resources to optimize the computer workloads' performance.

In further embodiments, the method further comprises setting a condition for the computer workload, wherein the condition determines if or when the cloud-computing resource can be deployed within the virtual private cloud to perform the computer workload.

According to other embodiments, a method is provided for a cloud-computing environment comprising a plurality of cloud-computing resources, the method comprising: receiving a computing workflow to be performed in the cloud-computing environment; identifying a computer workload to perform the computing workflow; associating a policy with the computer workload; testing the computer workload in a pre-production virtual private cloud (e.g., computing environment) within the cloud-computing environment; deploying the computer workload in a production virtual private cloud (e.g., computing environment) within the clouding-computing environment; and applying the policy to the computer workload during the computer workloads performance within the production virtual private cloud for consumption. In some such embodiments, identifying the computer workload to perform the computing workflow involves identifying a plurality of computer workloads to perform the computing workflow.

According to other embodiments, the present invention may provide a method and system for a virtualization environment adapted for development and deployment of at least one software workload, the virtualization environment having a metamodel framework that allows the association of a policy to the software workload upon development of the workload that is applied upon deployment of the software workload. The system and method may allow a developer to define a security zone and to apply at least one type of security policy with respect to the security zone including the type of security zone policy in the metamodel framework such that the type of security zone policy can be associated with the software workload upon development of the software workload, and if the type of security zone policy is associated with the software workload, automatically applying the security policy to the software workload when the software workload is deployed within the security zone. In embodiments, the security zone may be a geographic zone, a network zone, an enterprise zone, an operational zone, an organizational zone, and the like. The security policy may be an access policy, a write-permission policy, a resource utilization policy, an editing permission policy, and the like. The security policy may determine whether a software workload is allowed to operate in a specified security zone. The method and system may automatically establish firewall rules across multiple firewalls in multiple security zones for newly deployed applications by tagging application software workloads that are deployed within the security zones. The firewalls may be of types provided by different vendors and employ at least one of different operating system, communication protocols, and programming languages. The method and system may automatically remove firewall rules across multiple firewalls in multiple security zones when the firewall rules do not apply to software workloads within the security zones. The firewalls may be of types provided by different vendors and employ at least one of different operating system, communication protocols, and programming languages. The method and system may provide an alert when a software workload is planned to be deployed in a security zone in a manner that is inconsistent with at least one of a security zone policy applicable to the security zone and a security policy associated with the workload.

According to further embodiments, various operations described above are implemented using a computer. For example, some embodiments provide for a computer program product comprising a computer useable medium having program instructions embodied therein for performing operations similar to those performed by methods according to the present invention.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIGS. 9A-9D are screenshots of an example user interface in accordance with some embodiments of the present invention.

Figure 1:
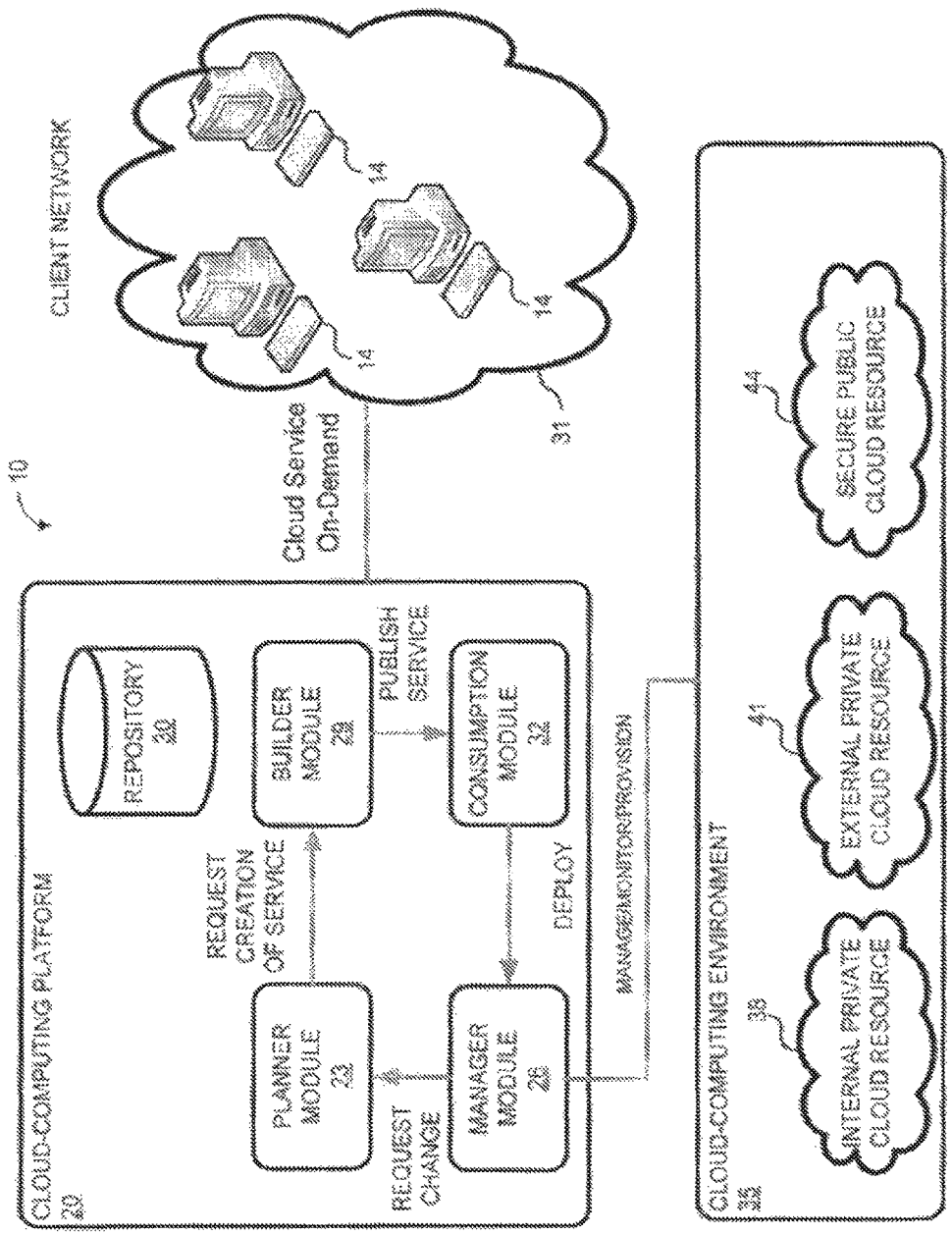
FIG. 1 is a diagram illustrating an example system in accordance with an embodiment of the present invention.

The figures are not intended to be exhaustive or to limit the invention to the precise form disclosed. It should be understood that the invention can be practiced with modification and alteration, and that the invention be limited only by the claims and the equivalents thereof.

While the invention has been described in connection with certain preferred embodiments, other embodiments would be understood by one of ordinary skill in the art and are encompassed herein.

All documents referenced herein are hereby incorporated by reference.

DETAILED DESCRIPTION

The present invention is directed toward a system and method for a cloud computing abstraction layer. Through various embodiments of the present invention, a user can plan cloud-computing services, build a cloud-computing service, publish the cloud-computing service for consumption by users, or run the cloud-computing service. Some embodiments of the present invention provide access to disparate public or private cloud-computing resources through a standard interface. Additionally, some embodiments can apply governance uniformly over disparate public or private cloud computing resources.

Some systems may, for example, enable: self-service access to cloud-computing resources by end-users, developers, and admins; automated services with respect to cloud-computing services comprising of one or more cloud-computing resources (e.g., management, building, configuration, publication, validation, and building of cloud-computing services); rapid provisioning (e.g., deployment, release, scheduling, control etc.) of cloud-computing resources within a cloud-computing service; governance control of cloud-computing resources within a cloud-computing service (e.g., application of security and non-security policies to cloud-computing resources), audit control of cloud-computing services; or secure access to cloud-computing services.

Advantages to the present invention's model include enabling a federated constituency of internal and external service providers that can be selected (and switched as needed) to provide best fit and value, such as between different internal and external cloud providers. For example, development projects, which maybe subjected to waiting times or interruptions, but which contain highly confidential information, may be deployed on a cloud that has low cost, but that has very specific security requirements, while commercial services, some of which are non-confidential in nature, might preferably be deployed on very fast, highly scalable cloud infrastructure to ensure high quality of service, but security requirements might be different than for a development project. A range of factors may be relevant to deployment of a particular project or service (or to a particular workload element related to it), including technical factors (the processing, storage, bandwidth, and other capabilities required to execute a workload), operational factors (such as when and where a workload needs to be available to meet the operational requirements of a business), and business factors (such as anticipated revenues, costs, quality of service requirements, and the like). By enabling federation of services, applications, platform elements, infrastructure elements and the like across multiple types of clouds (including internal and external clouds from varying vendors), while providing a single, unified interface for developing workloads and associating policies relating technical, operational, business and other requirements, the embodiments described herein allow an enterprise to satisfy such requirements much more effectively and efficiently than was possible with prior offerings.

On top of infrastructure elements provided for a cloud there may be platforms, stacks, software applications, and the like. There may be many different use cases and variations possible in an everything as-a-service" world, such as development and test environments as-a-service, databases as-a-service, platforms as a service, infrastructure as a service, software as a service, and many flavors of each offering different types of services, and the like. Benefits to the federated structure may include greater agility, vendor contestability, and innovation by transitioning an enterprise from a fixed to a variable cost infrastructure (thus avoiding enormous waste currently associated with fixed cost resources acquired by enterprises to meet peak needs but unused in off-peak periods), increased transparency (including the capability to compare the cost, functional benefits, and value of each sub-element of a service, platform, application, or infrastructure component), more direct revenue-to-cost operating models, right-place right size workload placement, minimal vendor lock-in and dependencies, improved standardization, lower risk operating environments, metered cost savings through "pay-as-you-go" economics and demand-driven consumption, faster time-to-market through on-demand provisioning, a compressed systems development life cycle (SDLC), lower costs by arbitrating market price between providers, elastic-dynamic capacity to meet peak demand, and the like.

The present disclosure also may provide security, governance, and policy enforcement to harness the power and agility of the operating model, a strategy and transition plan to move from a traditional operating model to an everything-as-a-service model, and the like.

FIG. 1 is a diagram illustrating an example system 10 in accordance with an embodiment of the present invention. FIG. 1 illustrates a cloud-computing environment 35 comprising one or more cloud-computing resources, a client network 31 comprising client computing devices 14 (e.g., desktops, laptops, smart mobile devices), and a cloud-computing platform 20 in accordance with one embodiment of the invention. In illustrated system 10, cloud-computing platform 20 provides a system through which computing devices residing on client network 31 (e.g., enterprise network) can access one or more cloud-computing services. A cloud-computing service comprises a cloud-computing resource residing within the cloud-computing environment 35 and managed by the cloud-computing platform to provide the cloud—may comprise one or more cloud providing networks that include cloud-computing resources (e.g., cloud services provided by public or private clouds, which may be external or internal to the enterprise that uses them) that can be utilized by users. Additionally, depending on the embodiment, platform 20 may reside on a client network 31 or separate from a client network 31.

Cloud-computing environment 35 may comprise an internal cloud, an external cloud, a private cloud, or a public cloud (e.g., commercial cloud). In the embodiment of FIG. 1, cloud-computing environment 35 comprises internal private cloud resource 38, external private cloud resource 41, and secure public cloud resource 44. A private cloud may be implemented using a variety of cloud systems including, for example, Eucalyptus Systems, VMWare vSphere®, or Microsoft® HyperV. Providers of public clouds may include, for example, Amazon EC2®, Amazon Web Services®, Terremark®, Savvis®, or GoGrid® Cloud-computing resources provided by these clouds may include, for example, storage resources (e.g., Storage Area Network (SAN), Network File System (NFS), and Amazon S3®), network resources (e.g., firewall, load-balancer, and proxy server), internal private resources, external private resources, secure public resources, infrastructure-as-a-services (IaaSs), platform-as-a-services (PaaSs), or software-as-a-services (SaaSs).

By using cloud-computing platform 20 to plan, build, manage, or use cloud-computing resources within a cloud-computing environment, users of platform 20 are provided with standardized access to a variety of cloud-computing resources from disparate cloud-computing systems and providers without concerning themselves with the proprietary details of accessing or interfacing with such cloud-computing systems and providers. The platform 20 is configured to take the workloads that are developed with the platform 20 (as more particularly described throughout this disclosure) and automatically provide the interfaces and access steps necessary to operate the workload on any particular platform or infrastructure element within a federation of cloud computing resources, such that the user is able to interact with the platform to develop such workloads at a level of abstraction that allows the user to configure the logic of the workload (including conditional logic that allows interrelation of different workloads) and to embody the technical, operational, and business requirements of the workload in policies that are associated with the workload, without the user being required to access or understand the details of (or in some cases even know about the existence of) such particular platform or infrastructure elements. Additionally, users of platform 20 can access cloud-computing services through platform 20 on-demand and on a self-service basis through the standardized access. Users of cloud computing services offered by platform 20 may include end-users, developers, partners, or administrators that reside on the client network 31.

Platform 20 may comprise planner module 23, manager module 26, builder module 29, and consumption module 32. Planner module 23 is configured to plan cloud-computing service provided by platform 20 by inventorying, profiling, characterizing and prioritizing computer workloads, such as programs, applets, calculations, applications, servers, or services. For example, with respect to software/application development, planner module 23 may model current applications and associated software-development life cycle (SDLC) phases to determine what infrastructure environments would be required or preferred. This may include defining security, privacy, management or other profiles for each SDLC phase of each application. The profiles, in turn, will identify existing infrastructure and systems that support the SDLC phases, and manage relationships between the infrastructure, systems and the applications. Profiles may also contain characteristics regarding the SDLC phases or attributes relevant to development, deployment or performance of infrastructure, systems, or workloads, such as latency, geography, responsiveness, bandwidth, storage capacity, processing speed, processing type, platforms involved (including operating system, file types, communication protocols, and the like), data involved, protocols used, and specific institutional requirements. In terms of prioritizing the cloud-computing services needed for the SDLC phases, planner 23 may first identify which SDLC computing environments and systems would be suitable for cloud computing or migration to cloud computing, and then prioritize the enablement and operability of newly developed or migrated computer workloads according to the SDLC phases. Subsequently, the characterizations determined by planner module 23 can be used by builder module 29 to build a cloud-computing service or to deploy a computer workload to a cloud-computing resource. In the planner module 23 or in other components of the platform 20 associated with the planner module 23 the user may have access to, or may create or modify, policy information relevant to the computer workloads with which the user can interact in the planner module 23. The policy information may be stored in or associated with a meta model, which may enable the identification, characterization, and storage of a wide range of information, including policy information, that can be associated with a given workload. The metamodel data, including policy information, can be associated with the workload such that throughout the various components of the platform 20, from planning through deployment to a cloud, the workflow can be handled in a manner that is consistent with the metamodel data, and in particular consistent with the policies that are applicable to that workload. In the planner module 23 the planner/user may thus plan the use of workloads in a manner that is consistent with technical, operational, and business requirements that are appropriate with such workload, as seen by association of the same with the workload, and the planner/user may modify or populate the policies associated with the workload, such that the metamodel data for that workload embodies and is consistent with the plans of the planner/user. Once associated with the workload, such policies and other metamodel data are stored by the platform 20 and may be used throughout the development and deployment cycle.

Builder module 29 may be configured to assemble, validate, and publish a cloud-computing service or computer workload for consumption (i.e., use) by a user. Builder module 29 may be configured to receive characterization information from planner module 23 and build a cloud-computing service or computer workload based on the information. For example, builder module 29 may be configured to assemble a cloud computing service based on the prioritized list of computer workloads provided by planner module 23. Builder module 29 may be configured to create and edit scripts for loading computer workloads during installation, startup, runtime, and shutdown of cloud-computing services assembled by builder 29. The scripts for the cloud-computing services may be verified and validated before the cloud-computing services are published for consumption (i.e., use). The script may have access to metamodel and policy information which may alter how the script uses the metamodel and policy information to make a decision. Additionally, builder module 29 may be configured to associate the computer workload with the appropriate cloud-computing service or resource (e.g., associate an application with an appropriate underlying virtual machine image or associate a computer workload with a specific network). As with the planner module 23, in the builder module 29 the user/builder may have access to, or may create or modify, policy information relevant to the computer workloads with which the user can interact in the builder module 29, such as the policy information stored in or associated with the above-referenced meta model, which may enable the identification, characterization, and storage of a wide range of information, including policy information, that can be associated with a given workload. In the builder module 29 the builder/user may thus build of workloads in a manner that is consistent with technical, operational, and business requirements that are appropriate with such workload, as seen by association of the same with the workload, and the builder/user may modify or populate the policies associated with the workload, such that the metamodel data for that workload embodies and is consistent with the plans of the planner/user. In embodiments, the builder module 29 may present options to the builder pre-filtered, such as inpre-populated scripts, filtered drop-down menus, that are dictated by or consistent with the policies and other metamodel data associated with a workload, omitting, blocking or hiding options that are inconsistent with such policies. For example, a workload that stores customer data could omit the option to store a social security number if a data privacy regulation prohibits storing such data in the business process to which the workload relates. Such automatic pre-filtering, pre-configuration, and blocking ensure consistency with the policies associated with the workload at the planning stage (or other stages) while also improving efficiency by removing development paths that might be pursued despite being prohibited. In embodiments, the metamodel provides a flexible structure to organize metadata and apply the same policies using a combination of system and user supplied metadata that may indicate use of the same policy, however may define the same policy in different ways. For example, in some embodiments, the system may consider a Tier 5 datacenter to be the most fault tolerant type of data center and a user may consider a Tier 1 data center to be the most tolerant. The metamodel allows a policy that requires provisioning in the most fault tolerant data center to be assigned Tier 5 or Tier 1 metadata, depending on the definition of the most fault tolerant data center in that specific operating environment.

Eventually, builder module 29 can publish a cloud-computing service for consumption by users. In some embodiments, the build module 29 will publish the cloud-computing service to a consumption module 32 (e.g., store or storefront such as an application store, a service store, or a software stack store) where users can preview, select, and subscribe to a cloud-computing service for use. Further, in some embodiments, the builder module 29 will enter the cloud-computing service in repository 30 when it is ready and available for consumption by users. Embodiments may also be configured the builder module 30 such that the development community can approve or disapprove of the cloud-computing service before publication.

Consumption module 32 is configured to allow a user to subscribe to, collaborate on, and assess a cloud-computing service published for consumption. For example, a user can preview cloud-computing services available for deployment to the virtual private cloud and consumption. Then, when a user wants to subscribe and invoke a cloud-computing service for usage, the user can invoke the cloud-computing service on a self-service, on-demand basis through the consumption module 32. Consumption module 32 may list published available cloud-computing service at or near real-time, and allow a user to request updates and information on a listed cloud-computing service. In some embodiments, the consumption module 32 may allow users to collaborate on where, what, and how many cloud-computing services are deployed for consumption. In further embodiments, consumption module 32 may allow a user to comment on and rate cloud-computing services, or assess the cost associated with deploying and using a cloud-computing service. As noted above, as with the planning module 23 and the builder module 29, the consumption module 32 has access to policy information and other metamodel data that is associated with each workload, such that the workload may be consumed only in a manner that is consistent with such policy information. Thus consumption policies related to permitted time, permitted sets of users, security, pricing, resource consumption rules, and a wide variety of other policies may be maintained by the consumption module based on the policies associated with the workload in the platform 20.

Management module 26 is configured to provision one or more cloud-computing resources for a cloud-computing service or computer workload, manage one or more cloud-computing resources for the cloud-computing service or computer workload, and monitor one or more cloud-computing resources for the cloud-computing service or computer workload. For example, manager module 26 may provision one or more cloud-computing resources (e.g., provision one or more virtual machine instances) for a published cloud-computing service that is invoked from the consumption module 32. Upon invoking the cloud-computing service, the manager module 26 may deploy and start the one or more cloud-computing resources to the virtual private cloud for the cloud-computing service.

With respect to control, manager module 26 may control the start, stop, or run-time of one or more cloud-computing resources (e.g., control start, stop, or run-time of virtual machine instance) for a cloud-computing service. Manager module 26 may further schedule the start and stop time windows for the one or more cloud-computing resources, or govern a service level, such as per a service level agreement (SLA), or a threshold associated with the one or more cloud-computing resources. Through its control, manager module 26 can govern the cloud-computing resource according to conditions, constraints, security policies, or non-security policies. Manager module 26 may also monitor the one or more cloud-computing resources, detect security intrusions, and monitor the consumption of cloud-computing services their associated cloud-computing resources in order to determine the costs accrued by a user. Aspects of cloud-computing resources monitored by manager module 26 include, for example, central processing unit (CPU) usage, memory usage, data storage usage, data input/output usage, application usage, workload usage, service usage, and other attributes of usage of a service or a computer workload.

In some embodiments, manager module 26 is configured such that a user can request a planner using the planner module 23 to change the design of a cloud-computing service. For example, a user may request that the cloud-computing service change or computer workload with respect to the cloud-computing resources utilized (e.g., change to a platform stack). As in the other components of the platform 20, in the manager module 26 the user may have access to, or may create or modify, policy information or metamodel data relevant to the computer workloads with which the user can interact in the manager module 26. The manager/user of the manager module 26 may thus manage the provisioning of infrastructure and platform elements such that usage will be consistent with the policies of the enterprise, including operational and business policies, as well as technical requirements. For example, provisioning to expensive infrastructure elements may be confined to workloads that satisfy business rules that distinguish between mission critical elements and other elements. The manager/user of the manager module 26 may be provided with access to the policies consistent with the metamodel framework, and in embodiments may be provided with pre-filtered options, such as in menu choices, decision trees, or the like, that are consistent with such policies. For example, a workload designated as non-critical in its metamodel data could automatically appear in the manager module with deployment options confined to relatively low cost clouds, while a mission-critical workload might appear with all different cloud options (or ones that are filtered to satisfy certain requirements as to low latency, bandwidth, storage capacity, guaranteed quality of service, or the like). As with other modules, the manager module 26 may thus enforce policy while streamlining workflow, improving both effectiveness and efficiency.

Figure 2A:
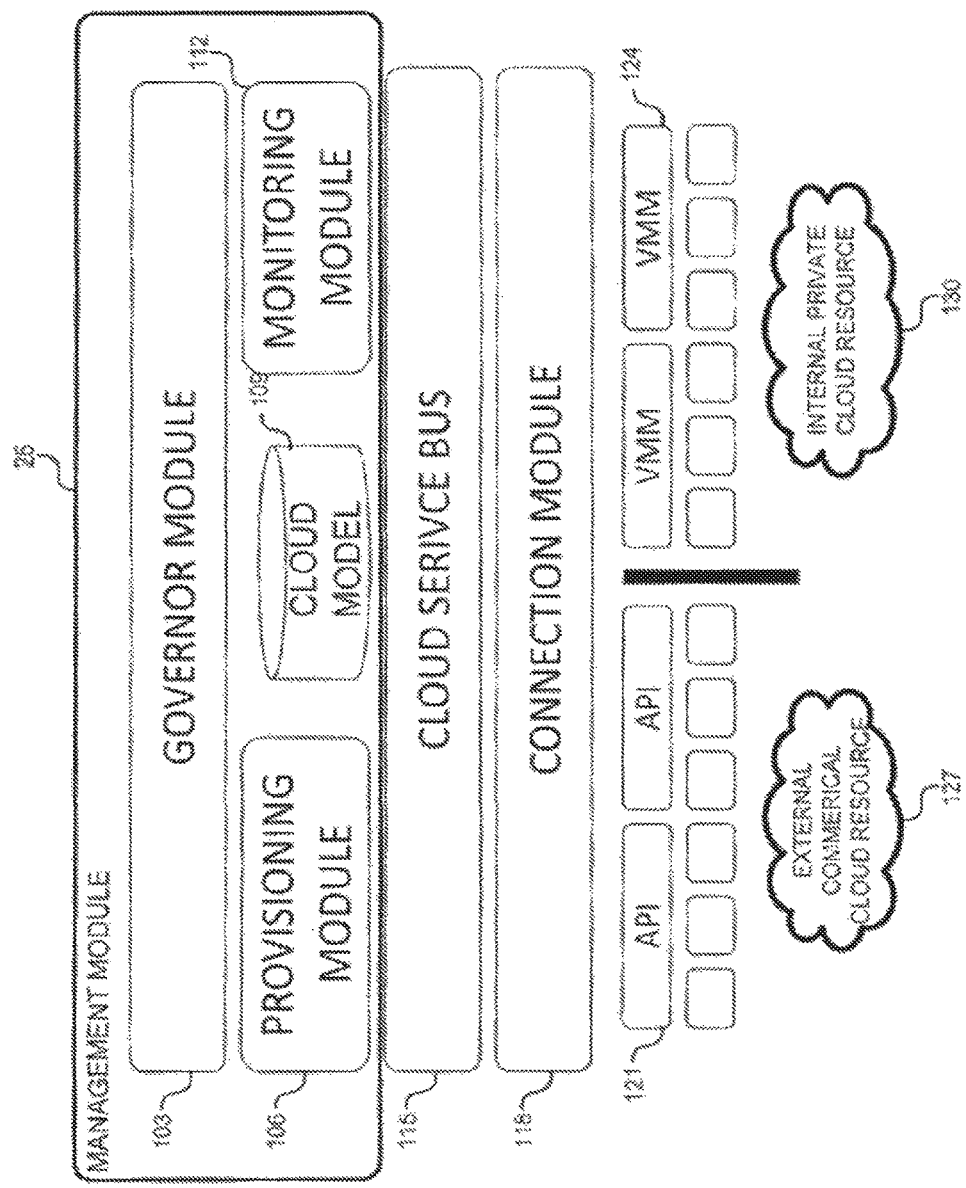
FIG. 2A is a diagram illustrating an example management module in accordance with an embodiment of the present invention.

FIG. 2A is a diagram illustrating example management module 26 in further detail. As illustrated, management module 26 comprises governor module 103 configured to govern operation of a cloud-computing services and its associated cloud-computing resources, provisioning module 106 configured to provision cloud-computing resources for a cloud-computing service, and monitoring module 112 configured to facilitate the various monitoring functions of management module 26.

In embodiments, the present invention may provide for a policy-driven infrastructure as a service (IaaS) event bus, which is comprised of a policy engine, metamodel, reporting system, and workflow engine; and allows for the creation of business policies, such that said business policies can be reflected into a dynamic information technology environment and expressed across internal and external information technology infrastructure, regardless of operating system, provider, by making use of abstraction layers. The workflow engine provides an integration point between the IaaS event bus and workflow management, as described elsewhere in this specification. The abstraction layers allow for integration with application programming interfaces made available by different vendors, business models, technical models, eventing and altering channels and monitoring systems in a vendor agnostic manner. In embodiments the abstraction layer could be a cloud-computing provider. A cloud computing provider may be VMWare, Baremetal, Amazon Ec2, Savis, TerraMark, Microsoft HyperV, and the like. In other embodiments, there may be multiple layers of abstraction in an abstraction layer.

The policy engine allows policies to be created through an easy to use visual interface that allows users that do not necessarily have information technology skills or other programming skills to author and assign policies to workloads. The policies can be expressed via languages such as XML, and the like. In some embodiments of the present invention a policy could be an event policy. An event policy supports matching one or more events that are temporally related and generate a notification action when matches occur. An event can be defined as either a threshold condition or matching constraints specified as rules. A rule is comprised of one or more match constraints and each match constraint must be satisfied, by a logical "and" operation, within a specified sliding time window in order for the notification actions to be invoked. A match specifies the set of conditions that must be satisfied to match an event. Each condition specifies a property of an event or object contained by the event, which is matched against a set of one or more values using the supplied comparison operation If multiple values are supplied for a condition then the result is a logical "or" operation of the property being compared and against each value individually. Any of the event properties or properties of objects contained within the event structure may be used to refine the match criteria. For example, an auto-scaling policy may be be created to add more web and database servers according to a ration if a business application becomes heavily loaded, in order to reduce the load on that application. In another example, an auto-scaling policy with business awareness may be created that deploys additional business topologies according to an algorithm if revenue per hour exceeds a threshold.

The metamodel allows the system to abstract business user definition from technical definition and allows an enterprise to track information about information technology resources that were unknown when the system was created. By abstracting the business user definition from the technical definition, the metamodel allows business users to define data classes consistent with their enterprise nomenclature, while still being able to map them consistently to the internal system. For example a Tier 4 data center is common technical classification of a data center that generally has the highest uptime, however some enterprises refer to Tier 4 data centers as Tier 1 and the metamodel would allow Tier 1 and Tier 4 to be used interchangeably, depending on the definition used by a specific enterprise. This provides a benefit to the enterprise by eliminating the need to write specific policies for each instance or the need to customized each abstraction layer for individual instances. By tracking information about IT resources that were unknown when the system was created, the metamodel allows business users to arbitrarily define elements of data to track and create policy after the system was built, also allowing the users to track a specific piece of information that is defined for any resources that are managed by the system. Resources could be networks, storage, servers, workloads, topologies, applications, business units, and the like.

In other further embodiments, the policy-driven infrastructure as a service may also include additional components. Additional components may be reporting, auditing, and federated identify management systems.

In embodiments, the present invention may provide for a visual policy editor, which provides an easy-to-use graphical user interface to a feature-rich and extensible policy engine, using a visual programming language and policies, eliminating the need for the user to write complex code to define, assign, and enforce policies. The graphical user interface allows the user to author policies using a visual drag-and-drop interface or an XML editor. The visual programming language functions could be loops, variables, branching, switching, pulling of attributes, code execution within a policy, and the like. For example the visual programming language could access an external pricing engine that contains live pricing information, then make a decision on the next step of the execution process, based on the information it receives from the pricing engine. In some embodiments, policies can be enforced at an object level. Objects could be organizational groups, individual projects, different deployment environments, and the like. Policies could be access control policies, firewall policies, event-based policies and the like. Access control policies could include packages, scripts, and the like. Access control policies could be defined by cloud or other service providers, network attributes, network geographic location, security policies, and the like. Firewall policies may include port and network ACL lists that are applied as policies and applied at container level to ensure conformance to corporate standards for port opening/closing. Event based policies relate to service level management and could include compound threshold rules that trigger an action, lifecycle event management, compound event sequences, signature detection, and policy stacking, and the like. For example, a policy could be defined to restrict deployment of a computing workload to private internal clouds in a specific country.

In embodiments, the present invention may provide for automated processes to support a continuous integration cycle to migrate a computing workload from a development environment to an operational environment. The continuous integration cycle may include maintaining a code repository, automating the build process, self-testing the build process, automatically deploying the build, and the like. The policies and metamodels defined and assigned to the computing workload environment follow the build from its creation using the Builder Module through to its publication into the Consumption module. This capability allows the enterprise to greatly reduce the time required to develop, test, deploy and update a computing workload. Continuous integration may also include ensuring the modernization, patch management, conforming configuration of deployed cloud-computing services. The embodiments may provide this service as DevToOps policy allowing centrally defined service definition that deployed cloud-compute services can compare against and either update themselves when their configuration no longer matches, warn administrators of non-conformance, rewrite themselves back to conformance when configurations of the cloud-compute services are made arbitrarily, and the like.

As noted before, various embodiments of the present invention provide standardized access, management, or control to different types of cloud-computing resources on a self-service, on-demand basis without the user needing to know the specific instructions or details for accessing, managing, or controlling those different target cloud-computing resources.

In order to translate a standard management action for a cloud-computing service to instructions for its cloud-computing resource and/or instructions for a computer workload to be executed on a cloud-computing resource, some management modules may comprise a cloud model data store 109 that maps the management action to the appropriate cloud-computing resources. Subsequently, the management action is translated to one or more instructions for a target cloud-computing resource and/or a computer workload operating thereon. For example, a topology is an example of a cloud service, where a topology is comprised of a number of individual virtual machines orchestrated together. A common management action to perform on a topology is to start it. This simple topology start action within the management layer gets turned into a number of individual instructions that get passed down into the cloud service bus, such as (1) calculate the Start Up order for topology, (2) initiate ordered startup one VM at a time, (3) as VM's come up, attach volumes that are associated with the VM, (4) install any packages and software onto the VM's, and (5) once all machines are up and running the topology status changes to running.

Cloud service bus 115 may be utilized to parse management instructions received from the manager module 26, transform the management instructions to instructions compatible with the target cloud-computing resource, and route the management instruction to the targeted cloud-computing resource. In some embodiments, the cloud service bus 115 then routes the instructions to the application program interface (API) for a target cloud-computing resource from external commercial cloud resource 127, or to the virtual machine manager (VMM) (e.g., hypervisor) for a target cloud-computing resource from internal private cloud resources 130.

Figure 2B:
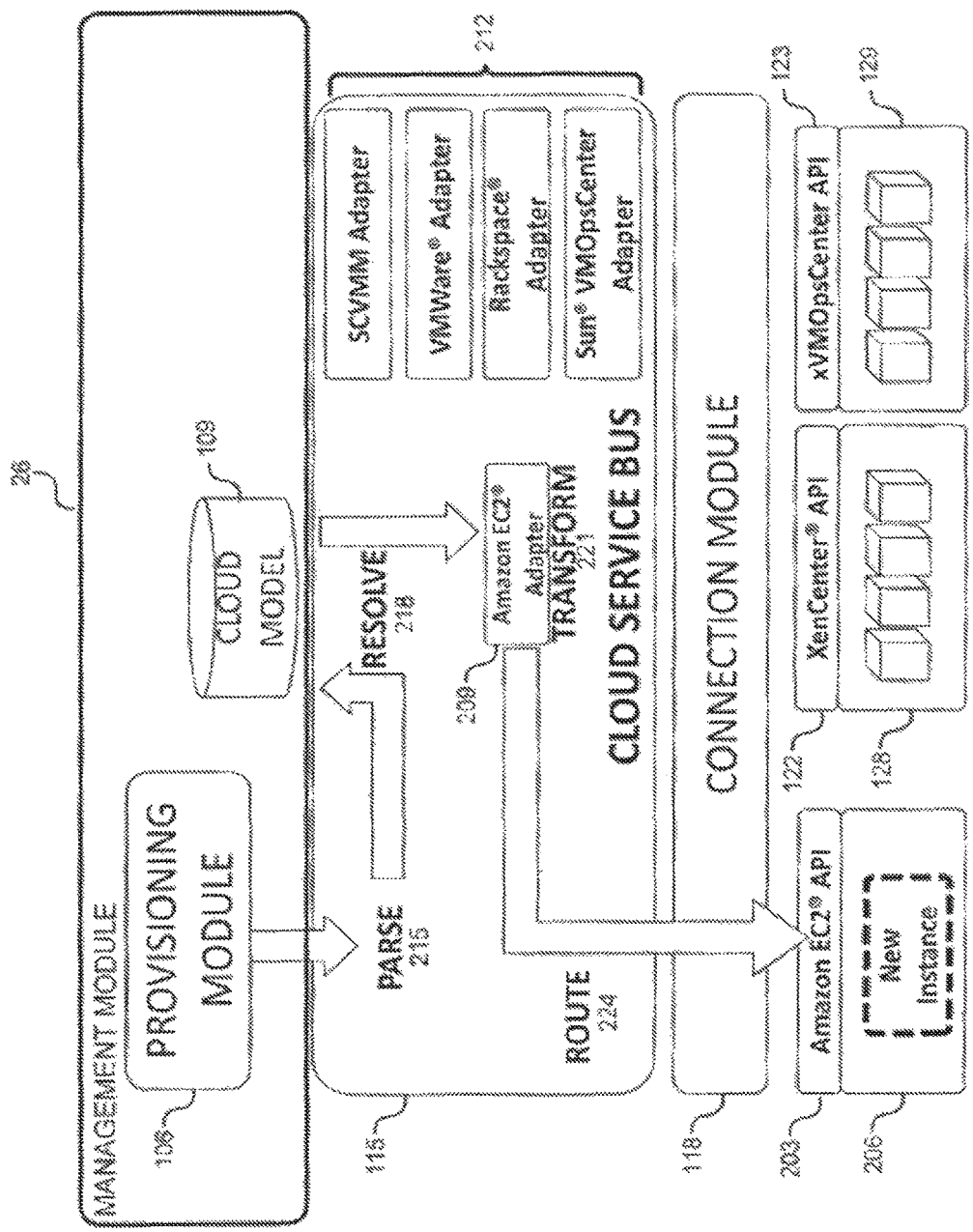
FIG. 2B is a diagram illustrating an example management module in accordance with an embodiment of the present invention.

FIG. 2B illustrates an example flow of management instructions from manager module 26 to a commercial cloud API. As illustrated in FIG. 2B, provisioning module 106 of management module 26 transmits a management action for a cloud-computing service currently deployed within a virtual private cloud (VPC) or a cloud-computing resource to be deployed in the virtual private cloud. Cloud service bus 115 receives the management action, parses (215) the action, and utilizes cloud model data store 109 to resolve (218) the action to the appropriate one or more cloud-computing resources associated with the cloud-computing service.

These management actions are then translated to target-specific instructions (e.g., commercial hypervisor API calls) by a target-specific adapter that connects one or more cloud-computing resources to one or more other cloud-computing resources or to the cloud-computing platform. Given the disparate types of cloud providers and systems that exist, each having a proprietary interface for access, management, and control, some embodiments utilize a target-specific adapter 209, 212 in order to connect to and interface with cloud-computing resources provided by those different cloud providers and systems.

In the illustrated embodiment, once target-specific instructions have been determined, cloud service bus 115 routes the instructions to Amazon EC2® adapter 209, which transforms (221) (or translates) the management action to one or more target-specific instructions that are routed to the Amazon EC2® API 203 for execution on the Amazon EC2® cloud-computing environment 206. Other adapters 212 illustrated include Microsoft® System Center Virtual Machine Manager, a VMWare® adapter, a Rackspace® Adapter, and a Sun® VMOpsCenter Adapter. Other APIs illustrated include the Citrix® XenCenter® API 122 used to interface with a XenCenter cloud-computing environment 128, or a Sun® xVMOpsCenter API 123 used to interface with the xVMOpsCenter cloud-computing environment 129.

In some embodiments, the instruction is transmitted to the Amazon EC2® API 203 through connection module 118, which implements a secure (i.e., encrypted) connection between the platform and the cloud-computing environment, the platform and client network, or the cloud-computing environment and the client network to ensure secure communication between the platform and environment. Connection module 118 maybe utilized, for example, when a cloud-computing environment does not provide a secure connection between a client and its cloud-provider network (e.g., a commercial cloud provider does not provide a secure connection as feature of their cloud services). Additionally, connection module 118 may be deployed and utilized on the client-side network when the client lacks a secure connection with the platform.

Figure 3:
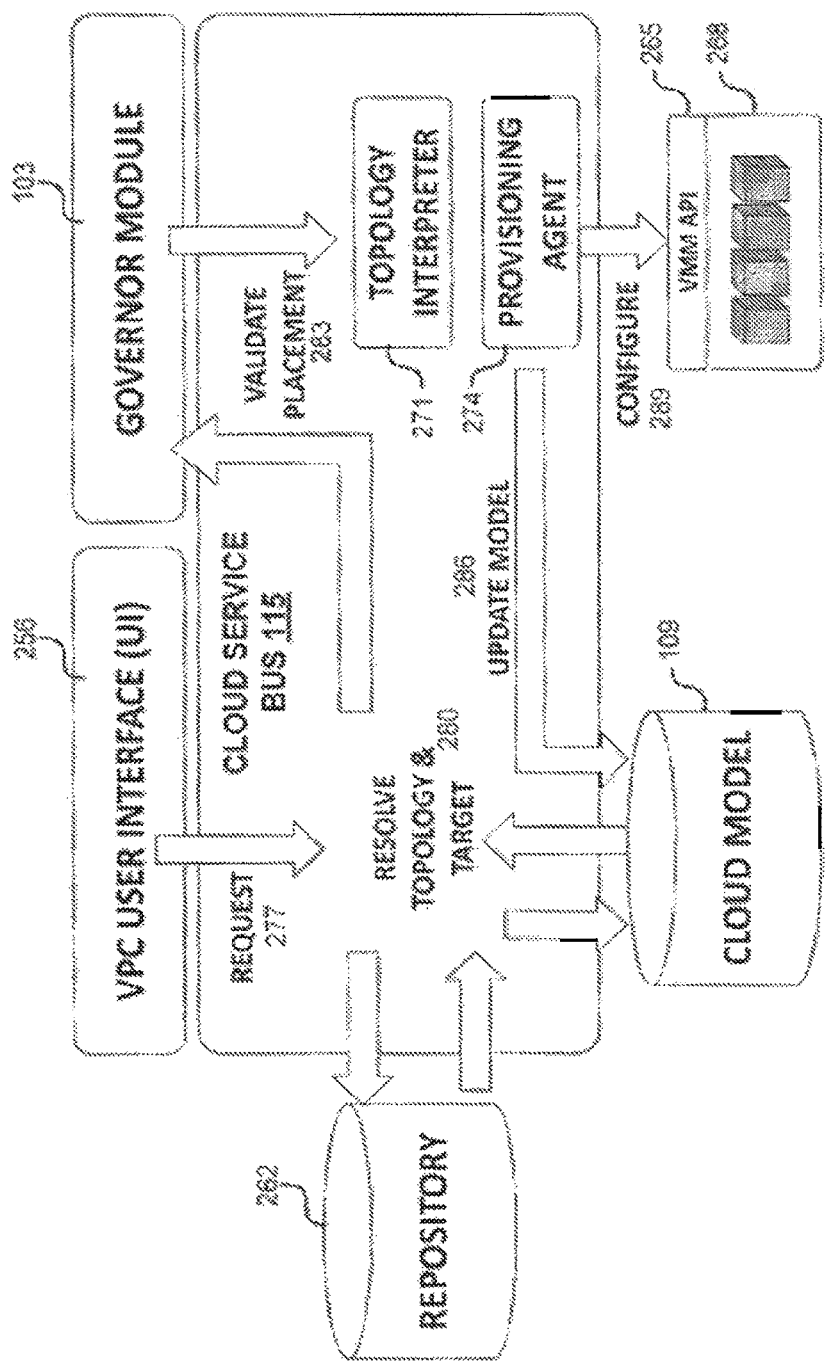
FIG. 3 is a diagram illustrating an example of provisioning in accordance with an embodiment of the present invention.

FIG. 3 provides a diagram illustrating an example of provisioning in accordance with an embodiment of the present invention. As illustrated in FIG. 3, upon receipt of a provisioning request from virtual private cloud (VPC) user interface 256, (asset) repository 262 is queried to extract all relevant metamodel information for the deployable assets (e.g., cloud-computing resource), such as a cloud-computing service have a specific topology. A simple topology may comprise a single cloud-computing resource (e.g., operating system running on a virtual machine) or a single tier of cloud-computing resource instances (e.g., LAMP server), combined to provide a cloud-computing service such as a web front-end. A more complex topology may comprise more than one tier of related cloud-computing resource instances such as a back-end database service tier, middleware tier, and web front-end tier, each tier performing a related service as part of delivery of an application to a set of users. The cloud model 109 is queried 280 to match the type(s) of cloud-computing resource instance with an appropriate provisioning request.

Upon a successful match, a policy management engine within governor module 103 is queried to ensure current policies allow for provisioning the cloud-computing resource from a cloud-computing environment, thereby providing "valid" or "right" placement 283, consistent with the handling of policy and the metamodel framework described above and throughout this disclosure. Topology interpreter 271 examines the request for the relationships of the cloud-computing resource instance(s) being requested and the access list (network port) assignments for the instance(s), and then passes the information to provisioning agent 274. Provisioning agent 274, in turn, queues the startup requests for the cloud-computing resource instances based on the defined startup order of the topology and provisions the instances and access list requests 289 through the virtual machine manager (VMM) API.

Figure 4:
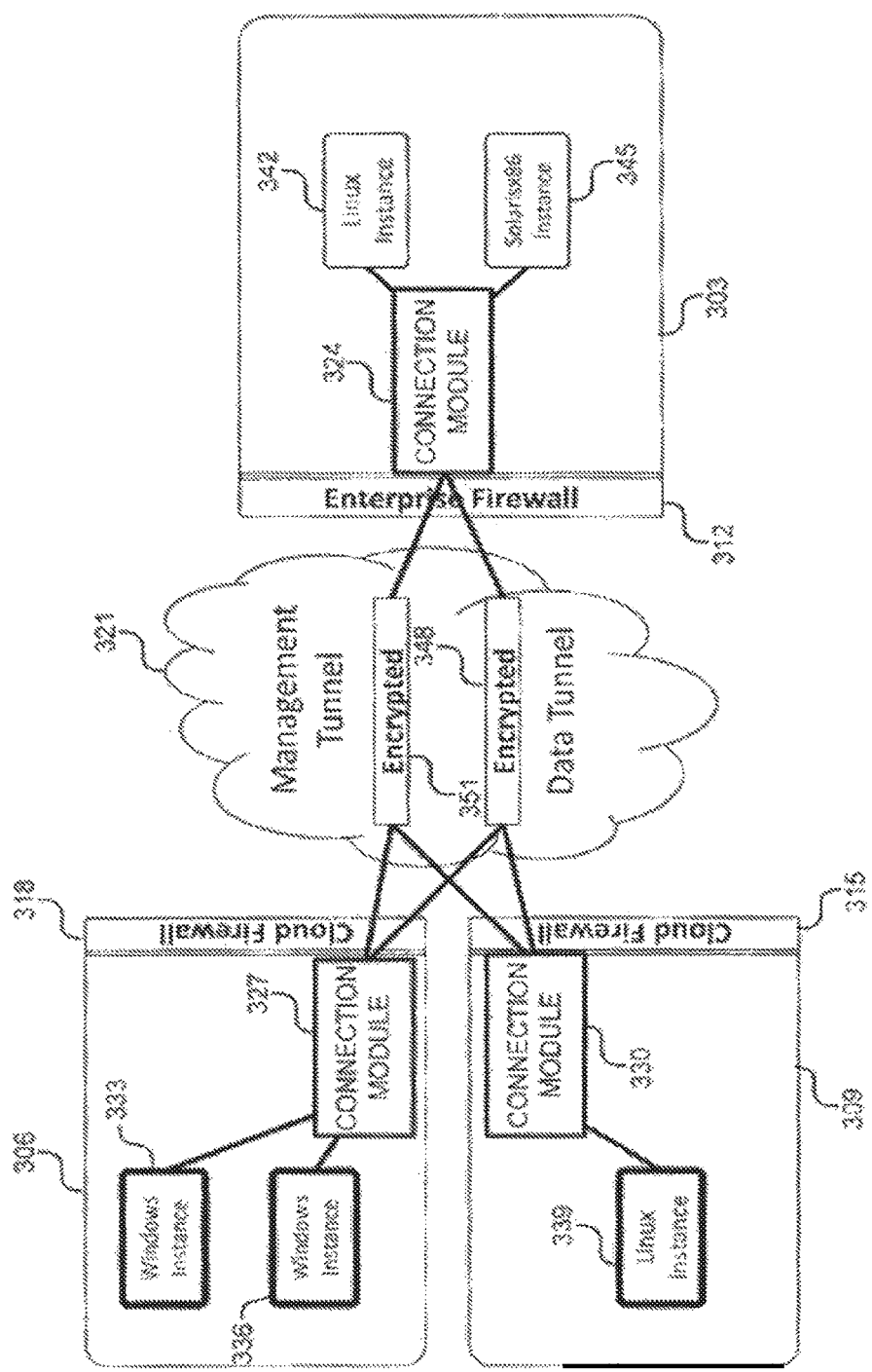
FIG. 4 is a diagram illustrating an example use of a connection module in accordance with an embodiment of the present invention.

FIG. 4 is a diagram illustrating an example use of a connection module in accordance with an embodiment of the present invention. Specifically, illustrated are two cloud-computing environments 306 and 309 each running instances of either Microsoft® Windows (333) or a distribution of Linux (339). Each cloud-computing environment is configured with a cloud firewall (315, 318) that blocks specified network traffic and defends the environments against malicious network traffic.

Illustrated opposite the cloud-computing environments is client network 303 (e.g., enterprise network) that has an instance of Linux 342 and Solaris (.times.86) operating and is equipped with it is an enterprise firewall 312. In order for the cloud-computing environments (306, 309) to communicate with client network 303 over external network 321 (e.g., the Internet), connection modules (324, 327, 330) are deployed on the three entities in order to establish and maintain encrypted communication tunnels (348, 351) between the cloud-computing environments (306, 309) and the client network 303. In addition, connection modules (324, 327, 330) establishes these encrypted communication tunnels (348, 351) through allowed ports on the firewalls (312, 315, 318). In FIG. 4, the connection modules (324, 327, 330) establish one encrypted tunnel for management (351) and another encrypted tunnel for data (348). The Platform 20 may support this concept in a plurality of ways. For instance, the platform 20 may have the capability to deploy what is commonly referred to as a VPN Overlay network. This network creates secure communication channels between two endpoints. In this instance, the network is setup by deploying "connection modules" into each of the different environments. The connection modules create secure connections between each other. Now when guest machines are created, they are configured to VPN into their appropriate connection module. From that point on all traffic is tunneled through these secure endpoints and traffic can be routed across network segments (i.e. in and between cloud providers and on premise). In another instance, a connection broker may rely on creating IPSec tunnels between individual cloud providers and an on-premise environment. This allows for traffic to traverse from one cloud environment to another via your own internal networks.

Further, the solution may be configured to combine a set of firewall configurations to enable a security zone model. Specifically as a new virtual machine is brought online the system can reach out to all the relevant firewalls and set up the appropriate communication. This can mean that the system will configure a host based firewall on the VM, a hypervisor firewall the VM is running in, physical firewall devices, and other firewalls such as the host or hypervisor firewalls running on any of the machines in the communication channel. This could mean that starting a VM will result in hundreds of firewall changes across the spectrum of all firewall devices and services that might be in the communication path.

In embodiments, the platform 20 may provide for end-to-end security across internal and external clouds, such as including secure data in transit from the platform to external clouds, secure access for users, secure encryption keys, secure logs for auditing, secure instances from breaches, secure data in storage, and the like. The platform may provide for comprehensive security capabilities designed for agile IT operating models, such as for network security, instance security, data security, access security, and the like. For instance, network security may include an encrypted overlay network across multiple clouds and enterprise data centers, firewall integration with support for multicast, static IP management, point-to-point routing, and the like. Instance security may include images with pluggable host-based intrusion detection systems and virus scanning, and the like. Data security may include images that utilize configurable encrypted block storage as well as SDKs for non-block storage requirements, and the like. In embodiments, access security may include federated identity management and granular role-based access control to instances and stores. For example, there maybe need to store credentials in a third-party encrypted key-store. The platform 20 may allow for storing of all credentials in its own encrypted key-store or the ability to store in third-party FIPS compliant key-store for added security and compliance.

In embodiments, the present invention may provide for a secure federation of internal and external cloud providers to operate as a trusted extension of an enterprise, establishing security policy and governance earlier in the lifecycle, combined with automated policy enforcement, to provide a more secure computing environment than previously available. Comprehensive security may include host intrusion detection systems and anti-virus protection, virtual firewalls, encryption of persistent data, secure connectivity, federated identity management, and the like. Network isolation may be provided to include a redundant customer-controlled encrypted overlay network service that provides security in a cloud across multiple clouds and between enterprise data centers and commercial clouds; support multicast, static IP management, point-to-point routing, firewall integration; and the like. Instance isolation may be proved through stacks including active host based intrusion detection and prevention packages; pluggable virus scanning integrated into each stack, and the like. Data isolation may be provided, such as including a configurable encrypted block storage system as well as SDKs for non-block storage requirements; backups of block storage devices inheriting encryption; configurations for encryption of data to be transferred or stored in non-block storage, a cloud manager providing granular role-based access control to instances and stores; certificate and key-pair access control of instance log-in, such as connections only over strong-encryption SSL; and the like. In an embodiment, an overlay network may extend the client's network into the cloud provider, such as through bridges to corporate network (e.g. like VPN); enhanced failover, load balancing, and peering; support extension of corporate IP assignments (e.g. both DHCP and static); support for point-to-point connections (e.g. servers that can talk directly to each other without having to go back to corporate data highway; ability to bridge multiple clouds; support for multicast; deployment of nodes in both the external cloud provider and the corporate data high; and the like.

Each of the security capabilities described herein may be provided for a particular platform or infrastructure network, as applicable, or may be applied across a security zone, as noted above, such that the security zone, which may reside across multiple clouds or networks, is maintained as a defined layer of security for all elements with the zone. Thus, security policies applicable to the zone may, by being associated with all workloads in zone in accordance with the metamodel and policy framework described throughout this disclosure, be enforced to ensure that all such workloads are deployed, executed and consumed in a manner consistent with the current security policies for the zone. The boundaries of each security zone and policies can be rapidly and conveniently updated, such as in the manager module 26, with assurance that all workloads within the zone will be provided with updated policies, as applicable, and that they will be handled consistent with such policies. As noted above, multiple security zones may be defined at differing levels of abstraction, such as geographic, business unit, user type, physical network, cloud, cloud type, or the like. Workloads in each zone will be required to satisfy the security policies of the zone, such that if a workload is deployed within overlapping zones, it will be subject to all policies for all such zones. For example, a transactional workload might have a security policy defining anti-virus requirements based on its presence in a security zone defined by the business unit that handles that transaction, but it might also be subject to data encryption requirements defined for a security zone defined by the legal department for all business units of an enterprise. The platform 20 may include the capability to view, manage, and edit security policies for security zones, including to highlight and resolve any potential conflicts among policies in the case of overlapping zones that apply to a workload. The ability in the platform 20 to plan, design, rapidly deploy, and manage workloads and related policies that comply with varying and overlapping security zones allows efficient satisfaction of constantly changing technical requirements (e.g., based on the latest anti-virus, firewall, and similar capabilities for a particular type of cloud or other infrastructure resource), shifting regulatory requirements (such as satisfying legal requirements for security of private user data), and shifting business requirements (such as providing security features that satisfy customer preferences as to security and convenience of use). Among other capabilities, the definition of security policies in the platform 20 at a level of abstraction that is independent of the infrastructure and platform elements on which a workload is deployed allows an enterprise to establish security zones that are vendor independent. A single security zone can have a defined policy, such as to satisfy a legal requirement, that is associated with a workload, and that is applied within a security zone that contains firewalls, routers, storage systems, and other elements that come from disparate vendors. The platform 20 automatically parses the policy and metamodel data associated with the workload and ensures that the infrastructure elements, regardless of type, are provisioned, updated and operated in accordance with the policy. This capability allows the enterprise to avoid a great deal of effort, often unsuccessful due to the time required and the rapidly shifting requirements, that has previously been spent analyzing, discussing, and updating security policies, then configuring a host of disparate devices in an effort to comply with the changing policies.

In some embodiments, the method further comprises: deploying an application, where the application is associated with one or more computer workloads; and where each application and/or computer workload is assigned a security zone; and tagging each application or computer workload based on its security zone such that firewall rules to permit the application to perform the computer workload are automatically and simultaneously applied to multiple firewalls within and outside the security zone assigned to the application. In some embodiments, the application may have complex security policies integrated within it during the development process of the application. Each application or computer workload may be tagged to operate in a specific security zone and communicate across security zones and each security zone may have a defined set of firewalls associated with it. In some embodiments the firewalls may be virtual firewalls or physical firewalls. In some embodiments the firewalls may be provided by multiple vendors such as Cisco, Juniper, and the like. In some embodiments the firewalls may be cloud-based firewalls provided by vendors such as Amazon, VMWare, and the like. For example, a database application that is tagged to operate in a highly secured security zone may require connectivity through a built-in firewall on the database server, a firewall upstream of the server between the highly secured security zone and a less secure corporate network security zone, and a firewall between the less secure corporate network security zone and a security zone that connects to the public Internet. An adaptor automatically determines the IP addresses assigned to each of the firewalls required to permit the application to perform the computer workload; and simultaneously on each firewall establishes rules required by the application, without restarting the system in which the firewall(s) operate. In other embodiments, the method further comprises removing the firewall rules when the application or computer workload is removed or stopped.

As noted before, connection modules such as those illustrated may be utilized when a secure connection is not readily available between a cloud-computing platform of an embodiment and a cloud-computing environment, between the cloud-computing platform of the embodiment and the client network, or between the cloud-computing environment and client the client network.

Figure 5:
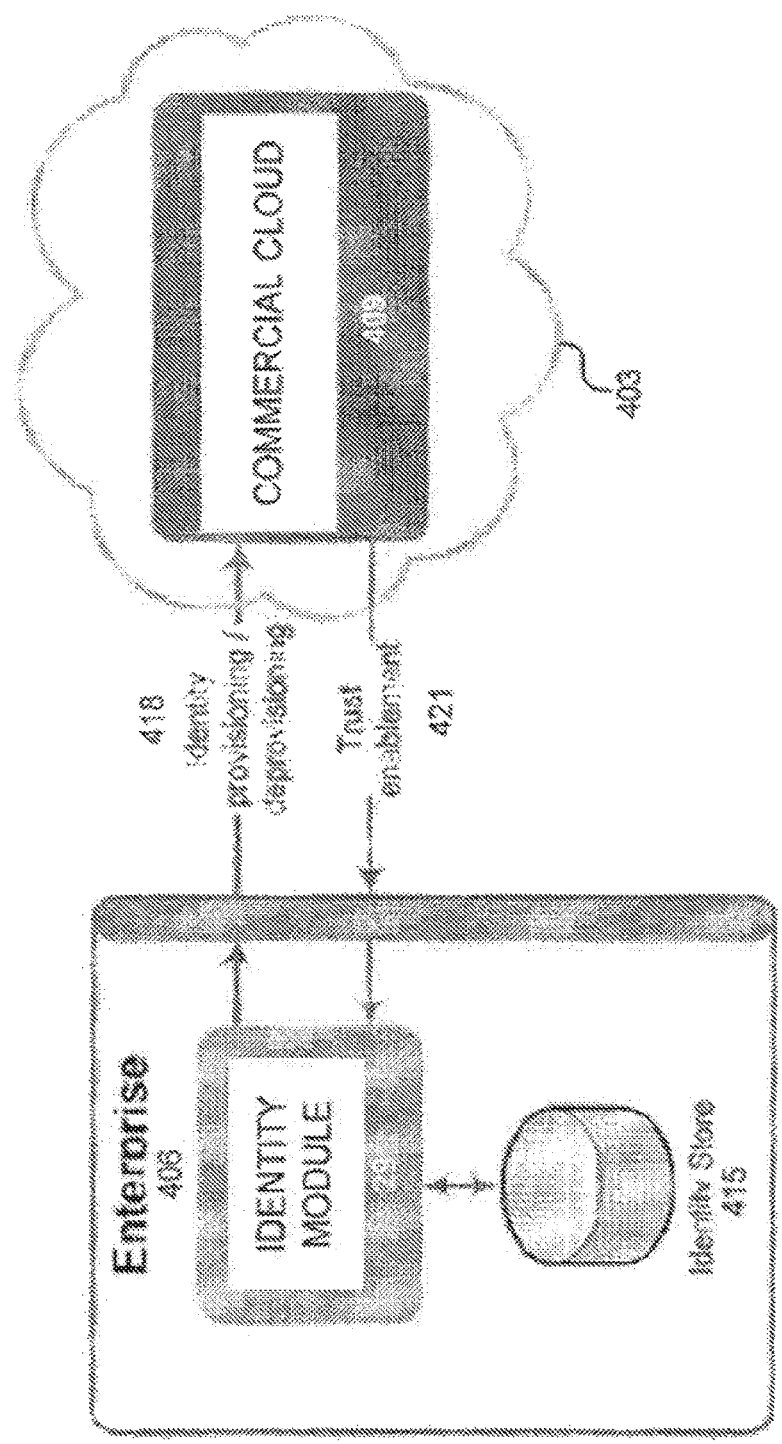
FIG. 5 is a diagram illustrating an example use of an identity module in accordance with an embodiment of the present invention.

FIG. 5 is a diagram illustrating an example use of an identity module in accordance with an embodiment of the present invention. In FIG. 5, enterprise network 406 is illustrated comprising identity module 29 in accordance with an embodiment, and identity store 415. Illustrated opposite the enterprise network is a cloud provider network 403 that is providing commercial cloud 409 (e.g., cloud-computing resource for a cloud-computing service) to enterprise network 406.

Identity module 29 facilitates identity provisioning and de-provisioning 418 (e.g., sign-on and sign-off) of a user to a service provided on a public (e.g., commercial) or private cloud. In some embodiments, identity module 29 performs this service by authenticating the user using the client's authentication system (i.e., identity store 415). For example, identity module 29 may authenticate a user using a locally deployed service, such as Netegrity®, Oracle OAM®, Microsoft® Active Directory, RSA® Cleartrust, Lightweight Directory Access Protocol (LDAP), and Kerberos. For instance, in one use case the platform 20 could be configured to use Active Directory (AD) as its user store. When a user wishes to console or desktop into a Virtual Machine that exists within a cloud environment, they may be prompted for credentials. The user supplies their credentials and the platform authenticates against AD. If there is a match, the platform 20 may log into the VM as Admin and create a new local account for the user based on the AD credentials. The user can now login to the VM. Another use case may deal with Software as a Service Integration, where a store, as described herein, may include the concept of purchasing user seats with cloud-based services, such as the commercially available service Salesforce. When a user, backed by the user's AD identity, orders a Salesforce user seat, the platform may provision an account for the user within portfolio of an enterprise, the platform may de-provision the useraccount within Salesforce. Users may also have the option to 'consume" Salesforce, which redirects the user to Salesforce and performs SSO. In another example, a user logs into the platform to access a Salesforce service, where first the user is authenticated (e.g. via AD, Netegirty), then based on his identity the platform 20 checks to see if the user has an account in Salesforce. If not, the system may create one in Salesforce by calling the Salesforce account management APIS. The system may also look up addition information about this user by doing database queries or other types of lookups against internal systems. If a user tries to access the service and the system detects the user should no longer have access (e.g. because the user has been terminated for example), then the platform 20 will initiate a process to delete the account and clean up all relevant data. This detection and cleanup process could also be initiated by a periodic job that gets run automatically by the platform 20 according to a schedule, by detection of events (such as changes made to AD), and the like.

In some embodiments, once a user is successfully authenticated using identity store 415, identity module 29 redirects that user's credentials to the cloud-computing service for authentication. Once the cloud-computing service successfully authenticates the user based on the forwarded user credentials, the user is redirected to the logged in cloud-computing service. It should be noted that identity capabilities may be applied to a cloud-computing resource as well as to a user, such that a specific cloud-computing resource may be authorized (based on its identity) to be used in connection with execution of a computer workload.

Figure 6:
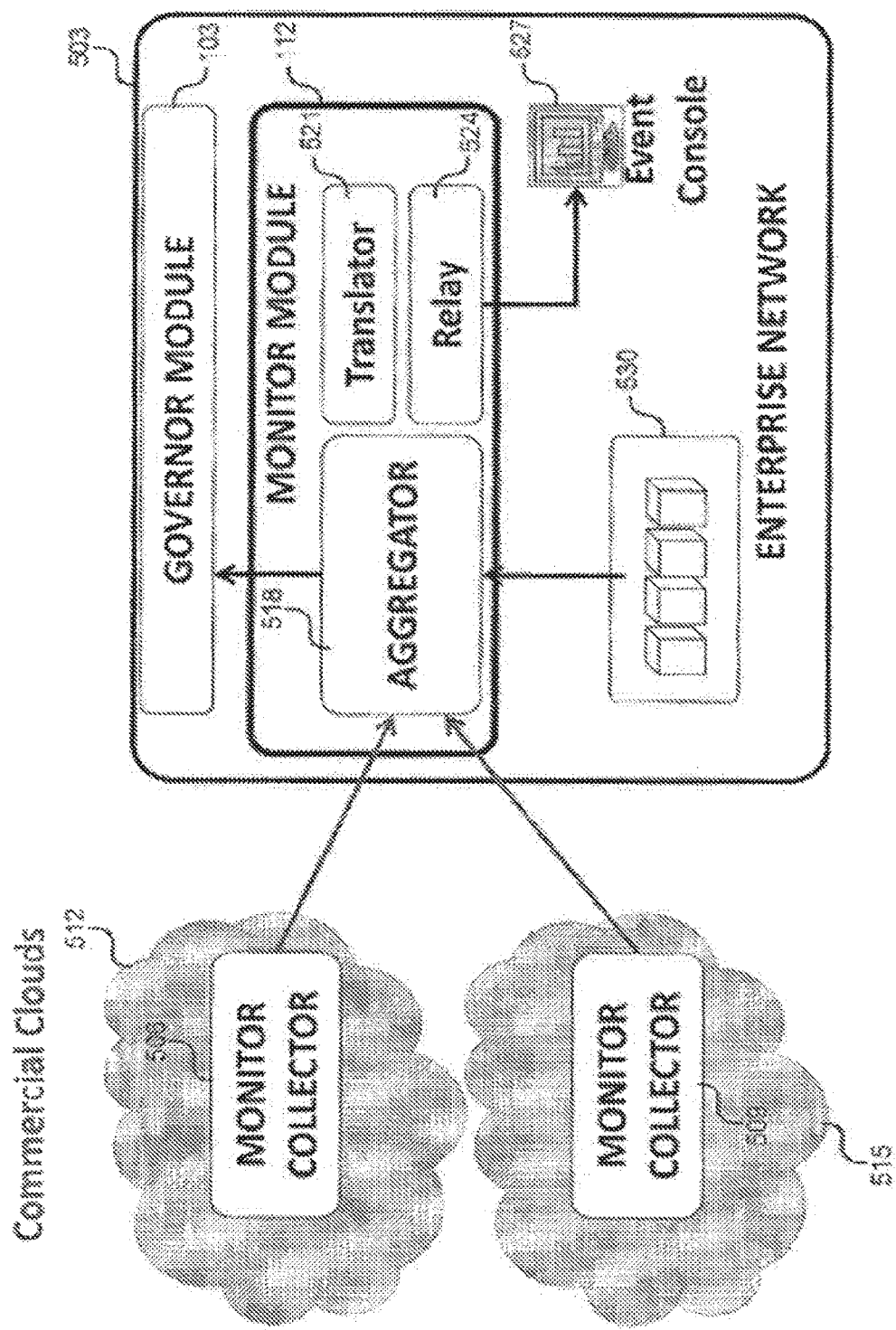
FIG. 6 is a diagram illustrating an example use of a monitor module in accordance with an embodiment of the present invention.

FIG. 6 is a diagram illustrating an example use of a monitor module in accordance with an embodiment of the present invention. As illustrated, governor module 103, monitor module 112 and private internal clouds 530 reside on enterprise network 503. Commercial clouds 512 and 515 are providing cloud-computing resources to the enterprise network 503. Monitor module 112 is responsible for monitoring the status and utilization of commercial clouds 512 and 515, and deploy a monitor collector 506 and 509 to the commercial clouds 512 and 515 to collect and transmit such information to monitor module 112. The collectors may provide a plurality of functions. For instance, the first thing a collector may do is collect information coming from the guests. The collectors may also persist this data and respond to queries about the data from the main Monitor Module. Being able to deploy these remote monitors provides many benefits, such as lowering bandwidth costs due to all of this data not having to be sent across WAN links (e.g., the data stays on the collectors, and is only retrieved when a specific query needs it), increasing scalability where each collector node can handle a large number of guests and as the number of guests increases additional collectors may be deployed to handle the load, and the like. In another instance, a deployed VM (e.g. to a VM of an Amazon cloud) may periodically report back its status as well as a set of performance metrics it was seeing. Based on this, the platform could detect if there was an outage at that VM. It could detect this as soon as a machine reported, or if a machine fails to make a schedule report. The monitoring system may be able to monitor events above and at the hypervisor. That is, the monitoring system may receive data not only from VMs, but that it may also be extended to call the low level APIs and metric systems of the hypervisors and cloud computing services and aggregate data from both locations to provide a holistic picture of the performance and status of the system.

Aggregator 518 receives the information from individual monitor collectors (506, 509) and monitor collectors (not shown) deployed to private internal cloud 530, and records the (received) monitor information for governance purpose, provisioning purposes, or administrative purposes (e.g., event reporting). Monitor module 112 uses translator 521 to interpret the monitor information from the commercial clouds (512, 515) and relays (524) the interpreted monitor information to event console 527. Aggregator 518 also forwards monitor information to governor module 103 to enable the module to govern the operations of cloud-computing resources and cloud-computing services being managed by a cloud-computing platform in accordance with an embodiment. The monitor and collector modules may all reside inside the Enterprise Network 503 as virtual appliances running within the internal virtualized Enterprise Network 503 compute environment.

Figure 7:
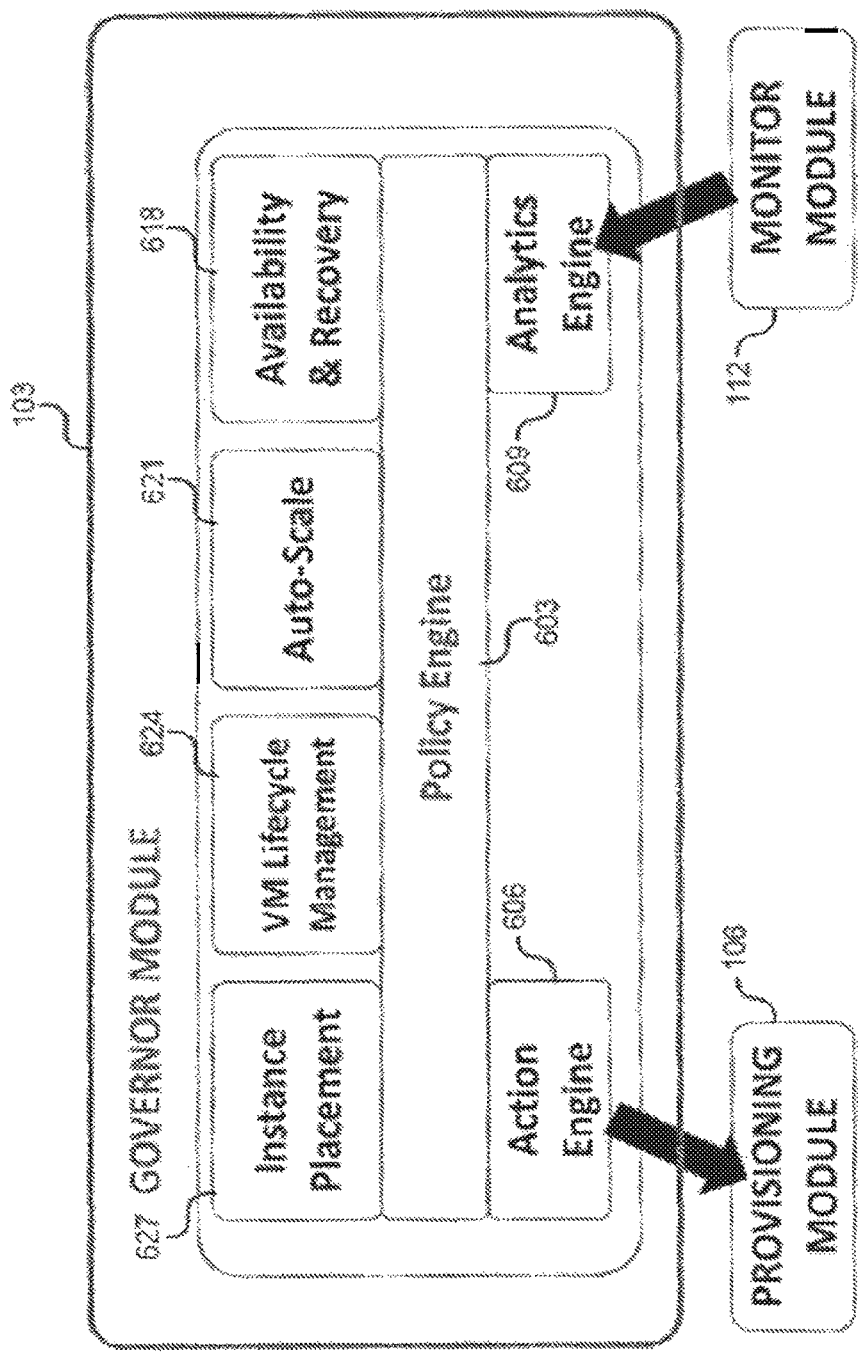
FIG. 7 is a diagram illustrating an example governor module in accordance with an embodiment of the present invention.

FIG. 7 is a diagram illustrating example governor module 103 in accordance with an embodiment of the present invention. Governor module 103 applies constraints, conditions, non-security policies, and security policies on cloud-computing resources and cloud-computing services being managed by a cloud-computing platform in accordance with an embodiment. In the illustrated embodiment, governor module 103 governs the cloud-computing resources and services by using monitoring information (from cloud-computing resources) provided by monitor module 112, and then issuing management actions (e.g. VPC actions) to cloud-computing resources based on monitoring information and the constraints, conditions, and policies the governor is applying to the cloud-computing resources.

In order to apply the constraints, conditions, and policies, governor module 103 uses analytics engine 609 to analyze monitoring information from monitor module 112 and, then, uses the analysis information to apply the constraints, conditions, and policies through policy engine 603. Based on the application of the constraints, conditions, and policies, policy engine 603 instructs action engine 606 to issue management actions to provisioning module 106 (e.g., issue management actions to increase or decrease the number of cloud-computing resources based on CPU utilization of the existing resources). For instance, when a new threshold policy gets created the threshold may be pushed down into the analytics engine. The analytics may be continuously evaluating the flow coming in from the monitor modules and evaluating the flow against its threshold definitions. When a threshold is violated an event may be created and sent to the policy engine. The policy engine may then determine which action to take and pass the instruction off to the action engine. In the case of auto-scaling the action engine may pass a provisioning or de-provisioning request to the provisioning module.

In embodiments, the flow amongst the monitor and provisioning modules and the analytics and policy engines may be as follows. In a step 1, the Monitor Agent may collect data in a variety of ways including polling the system for status, or alternatively it may receive information sent to it by some even or periodic sending of data by the application or service being monitoring. Step 2, the Monitor Agent rolls up the data, where the roll up may include aggregating and summing data, and it may also include filtering data out that is not required or within thresholds that don't need to be reported on. The data may be collected so it may be sent in bulk efficiently rather than parceled out and causing many interrupts. Step 3, the Monitor Agent may transmit data to the Analytics Engine. The analytics engine may then parse the data and again may perform aggregations, summation, filtering, or other correlation. Step 4, the analytics engine may then evaluate data against a set of configured thresholds that are configured by the policy engine. If a threshold is found to have been exceeded, then the event system may kick in and take action based on the configured policy. Step 5 is executing the configured policy action, which could include notification of some set of individuals or other system by phone, email, pager, txt message, event bus, programmed call out, shell script, or other configured mechanism.

In the illustrated embodiment, governor module 103 utilizes instance placement 627 to make decisions on where to place an instance of a cloud-computing resource. For example, when an image is built for a cloud-computing service using a builder module, it can be tagged (e.g., using a metamodel) to prevent deployment to certain zones (e.g., security zone) as part of a security policy, cost control policy, performance or availability management policy. Instance placement 627 may cause the governor module 103 to place an instance of a cloud-computing resource based on availability of client-computing resources, or (real-time) performance of particular clouds. Virtual Machine (VM) lifecycle management 624 may be utilized by governor module 103 to determine and enforce expiration of virtual machines Auto-scale 621 maybe utilized by governor module 103 to scale computer workloads being performed on one or more a cloud-computing resources. Auto-scale 621 can add or remove instances of cloud-computing resources to increase or decrease the performance of computer workloads based on monitored resource consumption, a schedule, or a set of rules. Availability & disaster recovery 618 may be utilized when operation of a cloud-computing resource has failed and the failed cloud-computing resource must be recovered according to the constraints, conditions, or policies governed by governor module 103.

Figure 8:
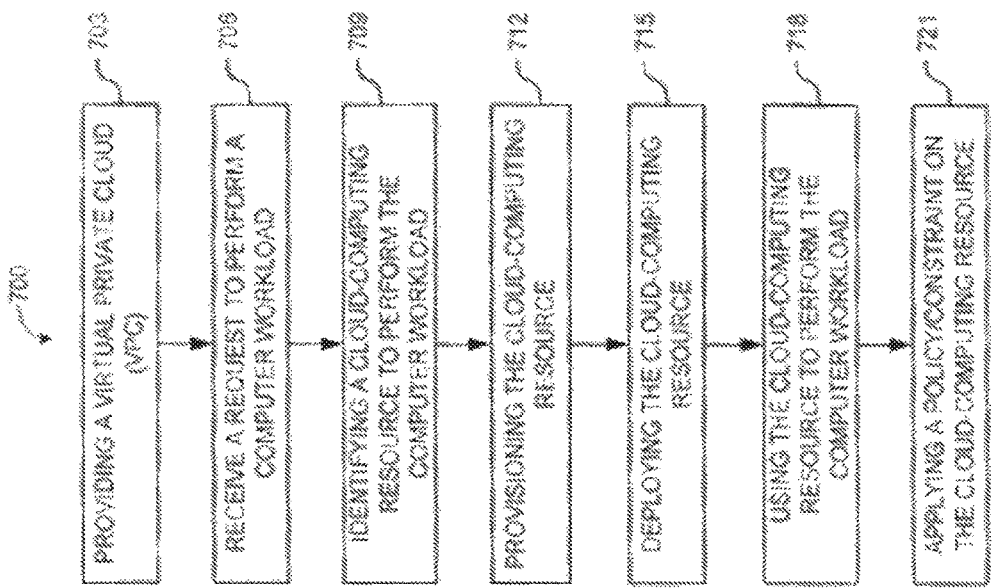
FIG. 8 is a flowchart illustrating an example method in accordance with an embodiment of the present invention.

FIG. 8 is a flowchart illustrating an example method 700 in accordance with an embodiment of the present invention. Method 700 begins at operation 703 by providing a user a virtual private cloud (VPC) configured to utilize a cloud-computing resource from the plurality of cloud-computing resources to perform a computer workload. At operation 706, method 700 then receives a request to perform the computer workload within the virtual private cloud. For example, in some embodiments, the computer workload may be an application, a server, a platform (e.g., LAMP server), or an infrastructure element (e.g., load-balancing unit). In another example, receiving the request to perform the computer workload comprises: receiving an application to be migrated to cloud-computing environment for execution; and identifying the computer workload as necessary for executing the application. In yet another example, method 700 receives a computing workflow to be performed in the cloud-computing environment; and then identifies a computer workload to perform the computing workflow.

Then, at operation 709, method 700 identifies a cloud-computing resource to perform the computer workload. For example, identifying the cloud-computing resource may be based on a workload score determined by a scoring logic. For instance, the scoring logic may be based on a business attribute of the computer workload (e.g., whether it is mission-critical, required to satisfy a legal obligation, required for an SLA, or the like), a technical attribute of the computer workload (e.g., storage required, bandwidth required, processing speed required, or the like), an operational attribute of the computer workload (time of day for availability, seasonality, or the like), or any combination thereof In some embodiments, the scoring logic may further be editable or grouped into collections of logic to provide scoring plans for examining multiple types of computer workloads different ways (e.g., a grid computing scoring plan scoring workloads for an application destined to a cloud-computing service hosting grid workloads). In other embodiments, the scoring logic may be editable to allow enterprises to store business, technical, and operational attributes of a computing workload, using enterprise-specific nomenclature or to allow for an enterprise to adjust attributes to a preferred score, consistent with business, technical, or operational metrics. In other embodiments, the scoring algorithm could be configurable, to weight the different attributes of the scoring algorithm based on business, technical, and operational metrics. The scoring algorithms are configurable in multiple ways and the scores are created by a set of rules. The rules may be cloud readiness rules, cloud value rules, or the like. The rule logic may be expressed as javascript, java, or the like. The rules make it possible to call any programming language system, configuration management data system, or the like. In embodiments, the information retrieved by the rules can be added to the metamodel for the specified information technology resource. Rules are evaluated according to a plan. A plan is a set of rules the weighting value assigned to each rule. For example, when a rule is a business criticality rule based on a set of metrics, and a plan is a "business contingency" plan, where the goal is to move infrastructure into a cloud that has disaster recovery and high availability built into it, the a system with the highest business criticality weight, may be moved first. When an item has been evaluated, the weighting values assigned to that item will be added to the metamodel associated with that item. Items could be systems, servers, databases, applications, workloads, and the like. Filters are used to decide where items should be placed. The filter first identifies the places where an item can be placed and then places the item in the place that is determined to be the best fit for the item. If data assigned to score an item is complete, it will be marked as scored and appear in relevant reports. If data assigned to score an item is incomplete, the items will be identified as requiring remediation. Different data attributes can be tagged as requiring different classes of individuals to complete the required information and preventing other classes of individuals from doing the same. Classes of individuals could be business users, technical users, and the like.

In embodiments, the present invention may provide for the categorization of workflows into workloads. Each computing workflow can be separated into a set of distinct workloads, each workload having requirements such as input, storage, processing, output, and the like. Each computing workload may have policy and metadata information stored by the system that includes what computing workload it is, how the computing workload is used, how quickly the computing workload needs to be performed, and the like. Each computing workload is instantiated through a customizable workflow. For example, a computing workload may require approval by a business unit, development team, quality assurance team, and an operations team. The workflow in this example would then be instantiated to solicit approval of requirements defined by each workload from each team.

At operation 712, method 700 provisions the cloud-computing resource from the plurality of cloud-computing resources for the virtual private cloud (VPC). For example, method 700 may provision by locating an unreserved cloud-computing resource within the plurality of cloud-computing resources; and reserving for the virtual private cloud the unreserved cloud-computing resource.

Method 700 deploys the cloud-computing resource within the virtual private cloud at operation 715. Where the cloud-computing resource is a virtual computing resource, the virtual computing resource may be deployed under control of a virtual machine manager. In other embodiments, method 700 may deploy the cloud-computing resource according to a condition for the computer workload, where the condition determines if or when the cloud-computing resource can be deployed within the virtual private cloud to perform the computer workload. For example, the condition may require that the computer workload for backup servers only operate during evening periods. To optimize performance of a computer workload, some embodiments may deploy a pre-determined set of cloud-computing resources to optimize the computer workloads" performance.

Once the cloud-computing resource is deployed to the virtual private cloud, method 700 uses the cloud-computing resource to perform the computer workload at operation 718. Then, at operation 721, method 700 applies a policy or constraint on the cloud-computing resource. For example, where a policy is associated with a computer workload, method 700 may govern operation of the cloud-computing resource performing the computer workload in accordance with the policy.

Figure 9B:
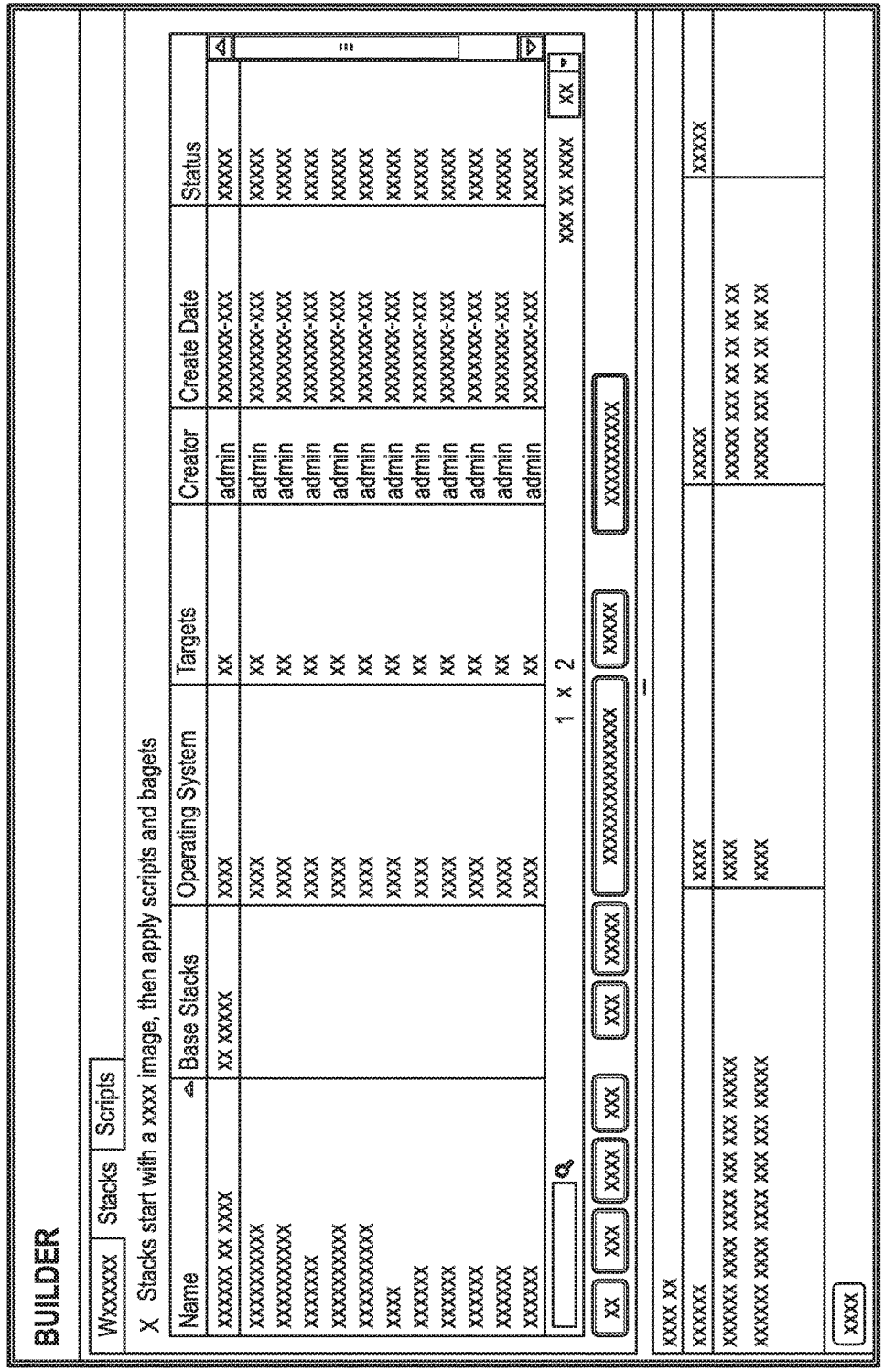
Figure 9C:
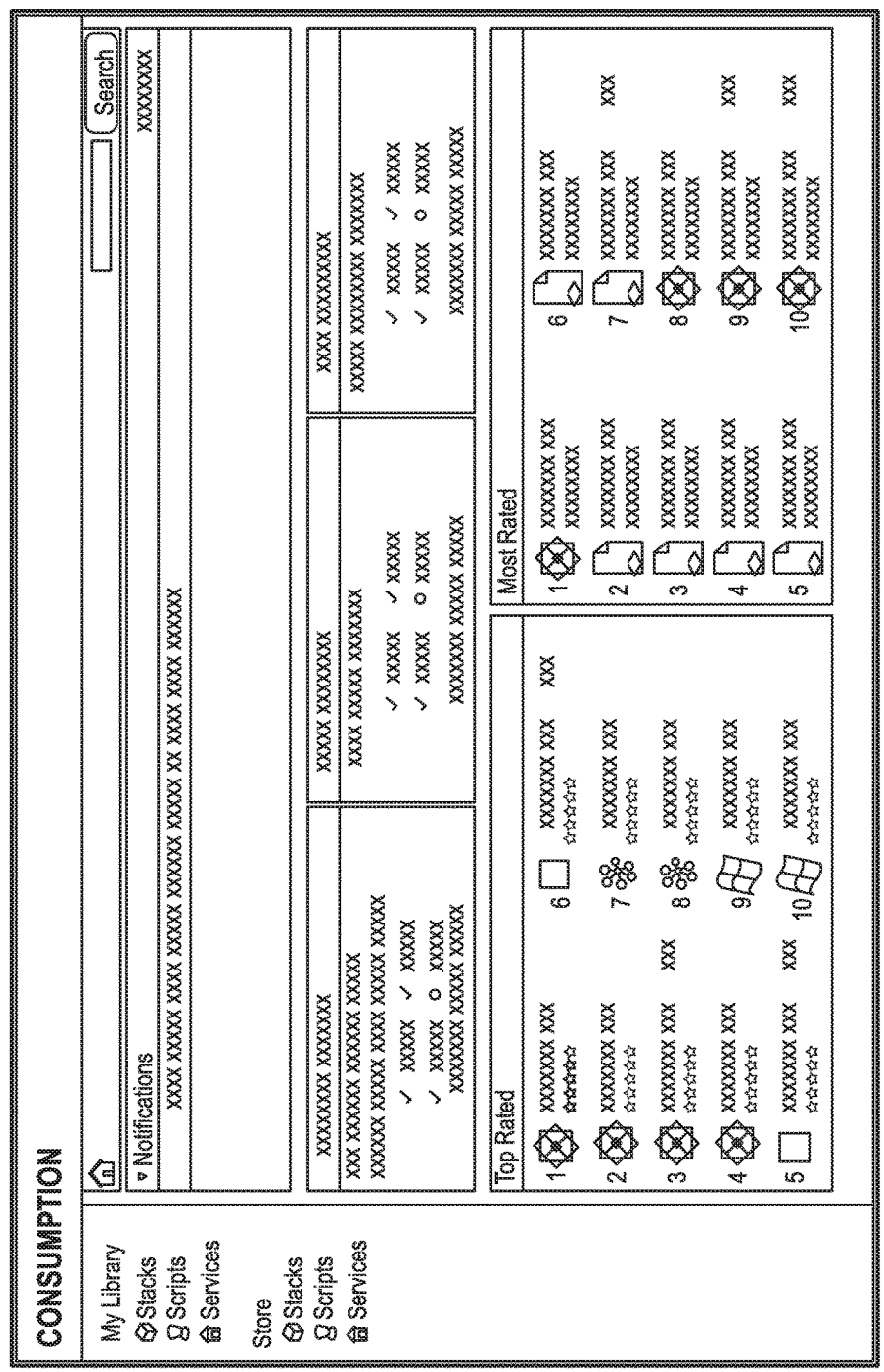
Figure 9D:
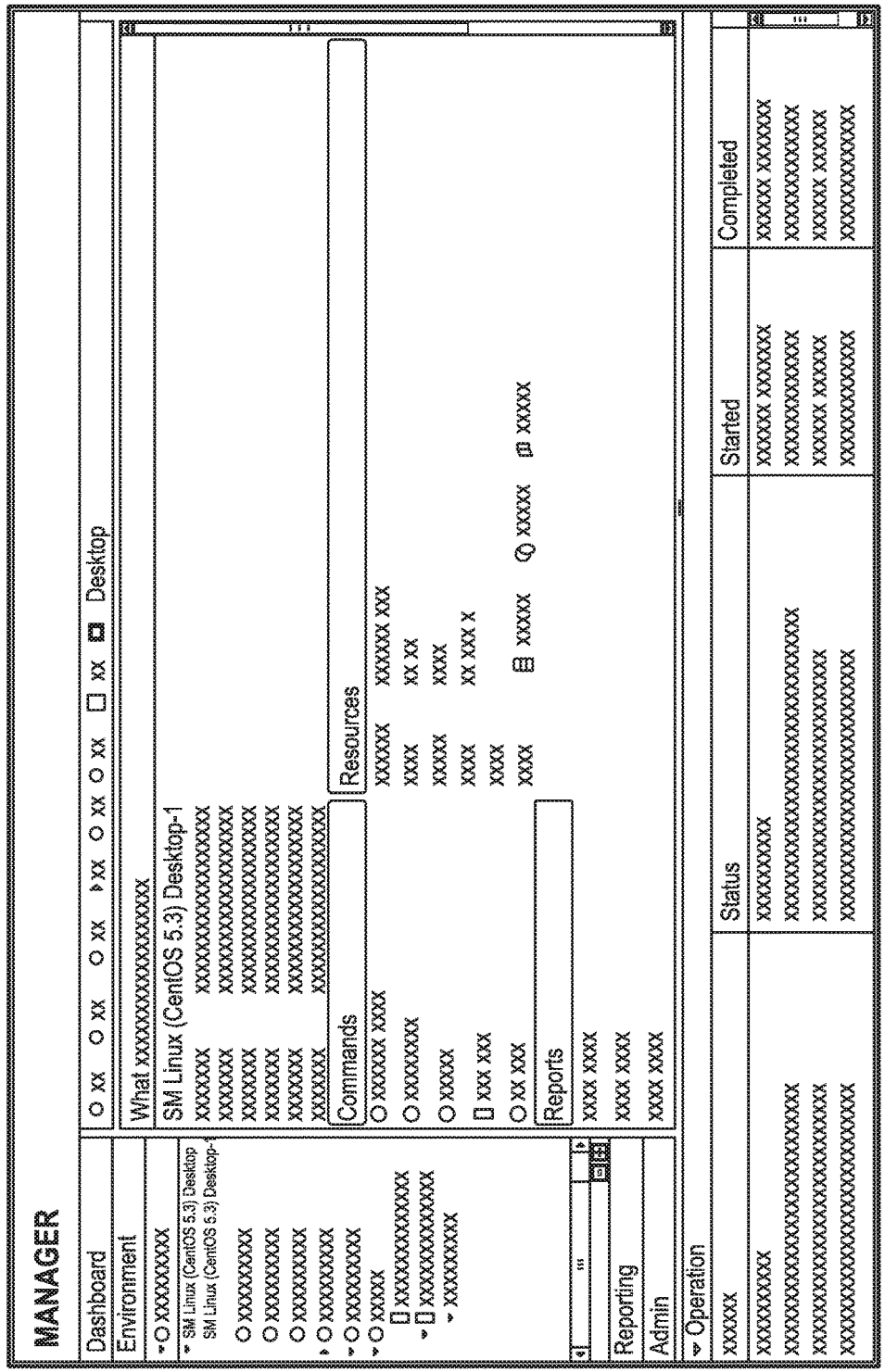

FIGS. 9A-9D are screenshots of an example user interface in accordance with some embodiments of the present invention. FIG. 9A depicts a screenshot of a user interface to a planner module, which can plan a cloud-computing service comprising one or more cloud-computing resources. In the screenshot shown, a corporate blog application and a logistics application are shown being planned for creation. FIG. 9B depicts a screenshot of a user interface to a builder module, which can build a cloud-computing service comprising one or more cloud-computing resources. The illustrated screenshot shows a stack being built on a Linux base stack. FIG. 9C depicts a screenshot of a user interface to a consumption module, which can be utilized by a user to subscribe to and use a cloud-computing service comprising one or more cloud-computing resources. The screenshot for the consumption module user interface allows a user to subscribe to and use such instances as Linux, Windows® 2003 IIS server, and Flatpress Blog Engine, and more FIG. 9D depicts a screenshot of a user interface to a manager module, which can be utilized by a user to manage cloud-computing service and its one or more cloud-computing resources. The screenshot shows the user interface of the manager module allowing a user to issue commands to cloud-computing services, such as stopping, running scripts, creating storage volumes, and attaching storage volumes to the cloud-computing services. The interface may be a web page, command line, development tool, and the like, such as eclipse or visual studio, and apps such as iphone/ipad applications. In embodiments, an API may be called that will allow a user to make changes and consume services in a way that is consistent with the company policy. For instance, an API may be implemented as a REST and SOAP interface, which are standard formats for services that may be exposed over different protocols in a standard way.

Project team members may have substantially different functional roles, and as-such, each user interface module may be designed to support one or more of the functional roles encountered in the Systems Development Life Cycle (SDLC). The user interface Modules represented in FIGS. 9A-9D maybe accessed and used by project team members and presented for the functions those team members may have in the systems development life cycle of the project for which the cloud-computing services are being designed, built, provisioned, and consumed. As well, the interface to each module maybe designed to best service the type of function that will be performed as part of the SDLC phase being addressed. The user interface components of each module may access the Policy Engine in order to represent the controls, access, and assets available to the functionally specific users in order to preserve the integrity, security and compliance of the cloud-computing services each aspect of the SDLC phase.

The present invention may provide a comprehensive enterprise-grade facility based on federation of IaaS, PaaS, SaaS, and the like, delivered by a plurality of internal and external cloud providers enabling advantages including the ability to intelligently govern, secure, and manage a user's critical applications for cloud environments; automate planning, building, sharing, and running lifecycle for optimal speed and efficiency, providing policy driven, end-to-end identity management across the plurality of cloud environments; deliver comprehensive cost, performance, and consumption visibility; integrate with a client's existing IT infrastructure including asset management, authentication and authorization, audit and governance, performance monitoring, and chargeback billing systems; and the like. In other embodiments, the present invention may provide for a layer that allows the input of chargeback billing data to be imported from reporting tools or integrated monitoring systems and the ability to "over recover" or "under recover" charges from the service provider's specified rates, providing a comprehensive audit trail. For example, if an enterprise is providing its internal users value-added services based on the Amazon EC2 service, the enterprise can add its own costs to the rate charged by Amazon, to recover the costs the enterprise incurs when providing the service to the internal users.

Figure 10:
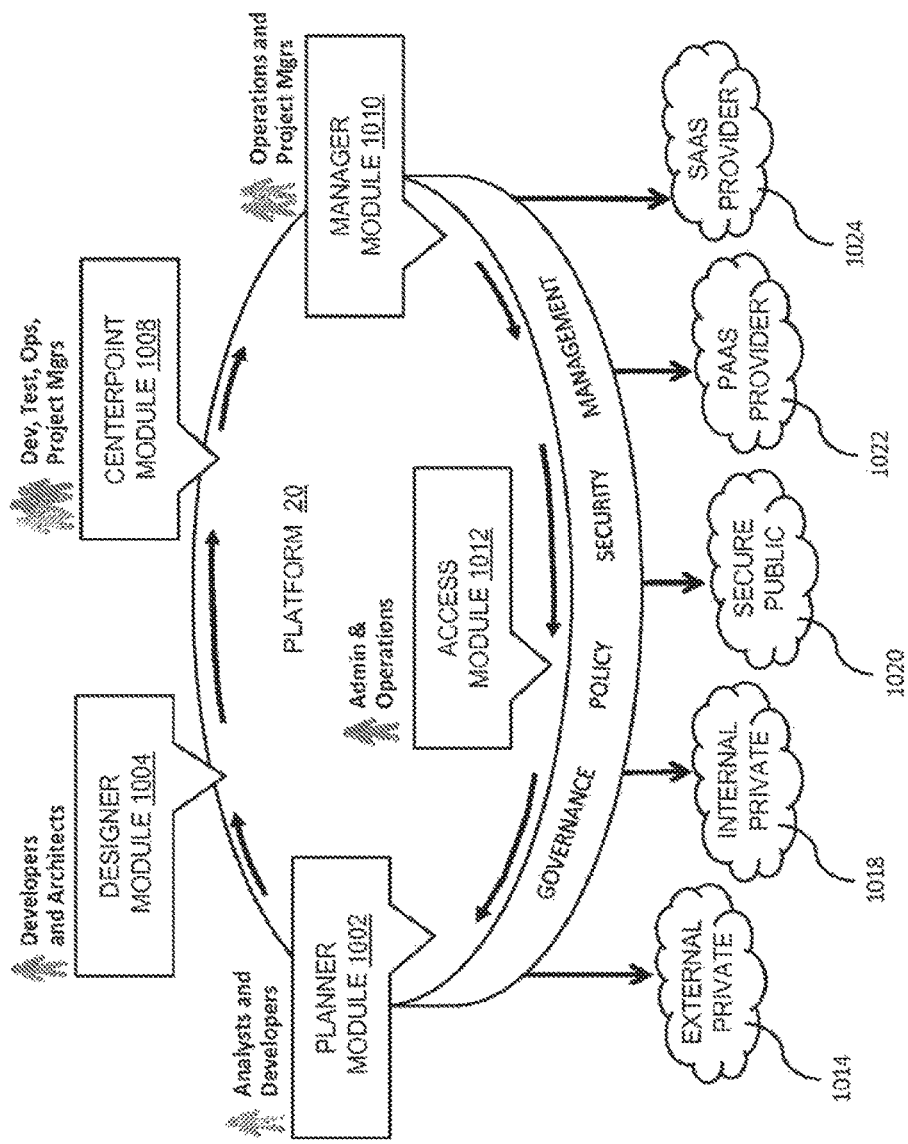
FIG. 10 is a diagram illustrating an example system in accordance with an embodiment of the present invention.

Referring to FIG. 10, an alternate module structure is depicted for the platform 20 for providing capabilities to specific roles across the lifecycle, including a planner module 1002 (which may have any of the capabilities described for the planner module 23), a designer module 1004 (which may have any of the capabilities of the design module 29), a centerpoint module 1008, a manager module 1010 (which may have any of the capabilities of the manager module 26), and an access module 1012, which may collectively provide the platform with management, security, policy, governance, and the like functionality as described herein. The platform 20, as in the example depicted in FIG. 1 and detailed herein, is able to provide virtual private cloud facilities to users through the cloud provider environment, including external private clouds 1014 (e.g. external companies, such as Savvis, with dedicated connectivity and instances), internal private clouds 1018 (e.g. current data centers that support virtualization and cloud), secure public clouds 1020 (e.g. multi-tenant architectures, such as Amazon), PaaS providers 1022, SaaS providers 1024, and the like. The functions depicted in FIG. 1 of the Cloud-Computing Platform 20 map directly to the modules depicted in FIG. 10, Platform 20 as follows; Planner Module 23 maps directly to the Planner Module 1002, the Builder Module 29 maps directly to the Designer Module 1004, the Consumption Module 32 maps directly to the CenterPoint Module 1008, and the Manager Module 26 maps directly to the Manager Module 1010. The Repository Module 30 of FIG. 1 is encompassed in the platform database and functions provided and depicted as Governance, Policy, Security and Management for the Platform 20. The Access Module 1012 provides a single sign-on function for the platform 20 allowing connectivity to enterprise identity systems such as LDAP/AD, which is shown in FIG. 5 and maps to the Identity Module 29. The planner module 1002 may help analysts and architects streamline application migration activities by analyzing and scoring application workloads to evaluate their suitability, generate recommendations right-sizing and right-placement across multiple internal as well as external service provider options. The planner module 1002 may also allow analysts and architects the ability to construct new rules and rule-sets for evaluating new and different types of application workloads in evaluating cloud readiness, cloud value, and right placement recommendations. The designer module 1004 may provide technical users with a graphical workbench to rapidly assemble policy-compliant stacks, workloads, and applications for any number of deployment environments. It may include a library of pre-built, reusable assets with the ability to create and publish new ones. The centerpoint module may facilitate the sharing and collaboration of cloud assets with fine-grain access controls, search capabilities, automated notifications, rating and commenting of assets, and access to detailed consumption reports. The manager module 1010 may provide a unified interface to streamline deployment and runtime management for any number of cloud providers, including monitoring of running instances and detailed performance and costing information. The access manager 1012 may deliver federated identity management to the full range of highly dynamic services managed (e.g. including IaaS, PaaS, and SaaS providers) along with the platform 20, It may also integrate with and support a plurality of protocols, such as LDAP, Active Directory, X.500, and the like. In each case the modules represented may reside on a common Policy Engine that ensures the integrity and security of the system by enforcing policy and access rights for the users accessing each module are only accessing those assets and functions that are allowed for their functional role.

Figure 11:
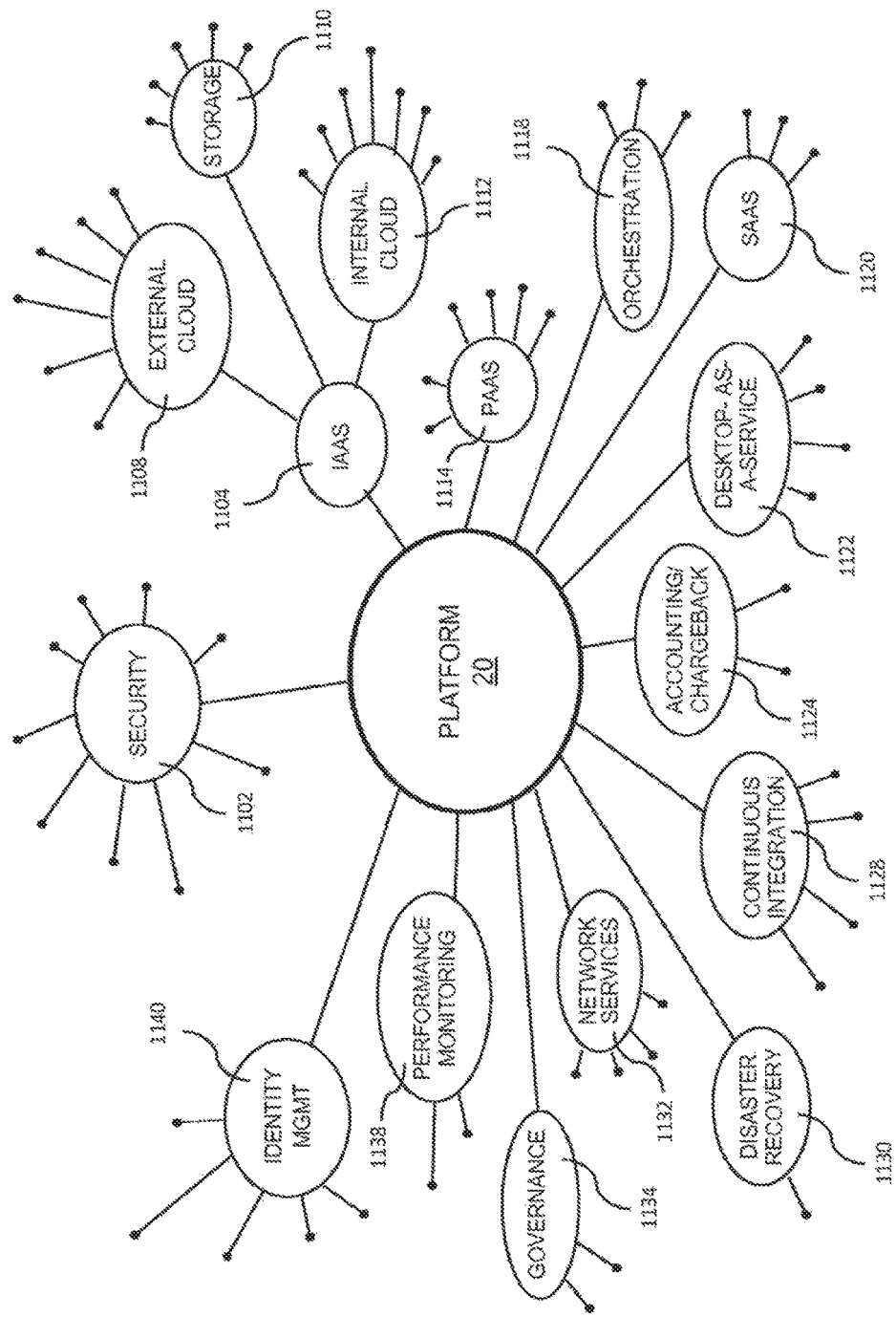
FIG. 11 is a diagram illustrating an example of an enterprise cloud ecosystem in an embodiment of the present invention.

The platform 20 may exist in an IT ecosystem and utilize a plurality of both cloud-based and dedicated resources to integrate with the platform, where these integration points may take place both within an enterprise's existing IT infrastructure, and also extend out to a plurality of external providers and services, such as in applying to both pre-production and production cloud environments. FIG. 11 provides an example illustration of the IT ecosystem as a plurality of these both dedicated and cloud-based resources, including security 1102 (e.g. proxy integration, host firewalls, hypervisor-based firewalls, host intrusion detection, external key store, VLAN management, VPN, file system encryption), IaaS 1104, external clouds 1108 (e.g. GoGrid, Amazon, Terremark, Fujitsu, Sawis, vCloud Director based Cloud offerings (Dell and others), Joyant, vCloud Express offerings), storage 1110 (e.g. NFS, VMFS, SAN, Amazon S3, EMC, Oracle, Netapp), internal clouds 1112 (e.g. vSphere, Cloud.com, Eucalyptus, OpenStack, HyperV, Xen, KVM), PaaS 1114 (e.g. Hadopo, Azure, EnterPaaS, Vmware CloudFoundry, IBM WebSpheree, Oracle WebLogic), orchestration 1118 (e.g. Autoscaling, Scripting framework, File management), SaaS 1120 (e.g. Salesforce.com, Intuit, Google Apps), desktop as-a-service 1122 (e.g. Citrix, VMware, Cicero, Framehawk), accounting and chargeback 1124 (e.g. Ariba, SAP), continuous integration 1128 (e.g. Collabnet, Apache Maven, Subversion, Jenkins CI), disaster recovery 1130 (e.g. Double Take), network services 1132 (e.g. DNS, DHCP, Load Balancer, NTP), governance 1134 (e.g. Axway, SOA Software), performance monitoring 1138 (e.g. Ganglia, Collectd), identity management 1140 (e.g. Oracle OAM, Netegrity, LDAP Kerberos SAML, RSA ClearTrust, Active Directory), and the like.

Figure 12:
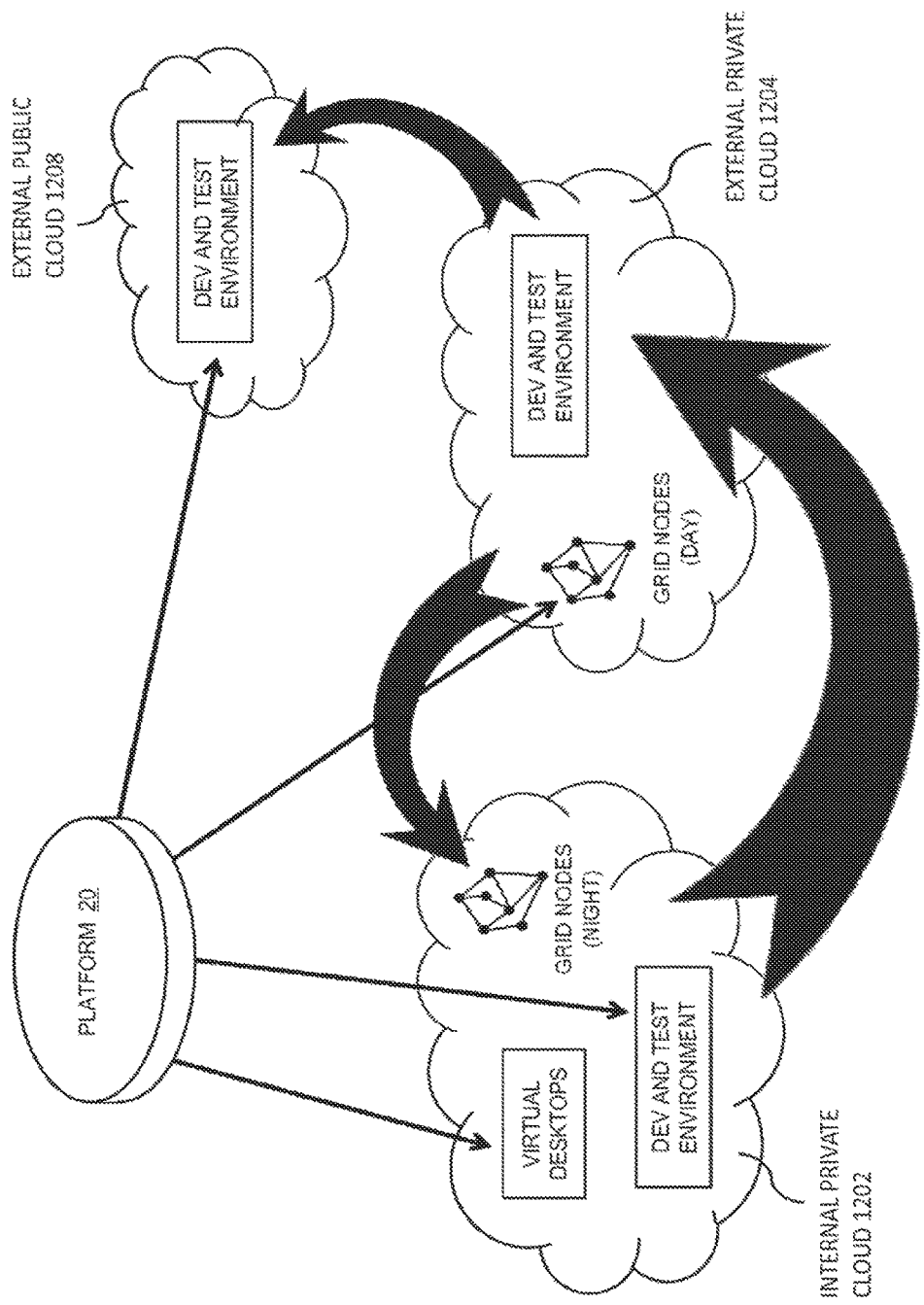
FIG. 12 is a diagram illustrating an example of a policy-driven governance and control scenario in an embodiment of the present invention.

Referring to FIG. 12, the platform 20 may deliver unified governance for IaaS, PaaS, and DaaS workloads across a federation of internal and external cloud providers 1202, 1204, 1208, to leverage scheduling and placement policies to optimize the placement and type of workloads that are being run on a temporal or scheduled basis. As an example, during the day, scheduling policies may devote much of the cloud compute capacity to running virtualized desktops, however, as the evening approaches and workers go home, the demand for DaaS drops, and the cloud compute capacity can be utilized for compute intensive applications such as financial trade simulation models running on grid-compute nodes. This policy approach also allows cloud-compute services to be shifted to lower cost Cloud Provider environments. As such, the inherent policies provided by the platform 20 lower costs by maximizing the utility of the cloud infrastructure while also having the same effect of lowering costs by aligning workload placement to provider environments best fit to run those types of workloads.

In embodiments, policy-driven governance may be integral to the platform 20 and to the end-to-end lifecycle to create and enforce policies in a closed-loop governance lifecycle, such as extensible policy framework to support unique needs, customizable approval workflow, integration with corporate audit and governance systems, establishing a foundation for audits and policy reviews, and the like. Referring again to FIG. 10, the planner module 1002 may contribute to the creation of design-time policies, such as access rights, right-placement parameters, regulatory restrictions, and the like. The designer module 1004 may contribute to the creation of run-time policies, such as auto-scaling parameters, maximum instances allowed, and the like. The centerpoint module 1008 may enforce access policies, ensuring that the right users are accessing the right assets and deploying those assets in the right places, and the like. The manager module 1010 may enforce run and design-time policies, such as allowing cloud-compute services to scale up or down in response to load or other conditions in the environment as well as prevent users from consuming arbitrary amounts of compute resources, and the like. The access module 1012 may enforce access policies across internal and external service providers, and the like. In this way, policy creation is an integrated process across the platform.

In embodiments, the present invention may provide many advantages, including a unified interface to deploy and monitor workloads across internal and external service providers; rapid creation of new workloads and re-architect existing ones for cloud portability and on-demand provisioning; automated right-sizing, right-placement, and user access decisions via enforceable policies; deployable and dynamically configurable complex application topologies in real-time; meter usage with integrated chargeback and billing; real-time monitoring and support for auto-scaling and bursting across multiple clouds; federated identity management across internal and external providers; pre-built library of re-usable stacks to accelerate assembly and deployment; incorporated end-to-end security that spans network, access rights, instances, and data; complete visibility and transparency via role-based reports, policy reviews, and audit trails; creation and enforcement of policies in a closed loop governance and management lifecycle; score and prioritization of workloads for migration; consolidated monitoring, reporting and metering including integrated chargeback/billing; platform deployment flexibility to locate securely on premises or as a SaaS offering; and the like.

Automated governance through the present invention may enable new capacity optimization strategies to maximize the utilization of hardware and server resources through the dynamic placement of different sized workloads, where the platform may manage placement of workloads from large (e.g. production applications, load test environments) to small (e.g. virtual desktops), perform monitoring and manage application auto-scaling, rollovers seamlessly to external cloud providers when internal capacity limits are reached, and the like. Use of the platform across a plurality of cloud workloads, may allow the user to create new capacity optimization strategies to make the most from a user's internal resources, such as though dynamic placement of different sized workloads, and combining these workloads to achieve high capacity and/or utilization of a given computing facility. To enable this, the platform may perform application monitoring, workload placement, workload scheduling as well as workload and application auto-scaling, and the like, as appropriate.

In embodiments, the present invention may provide for a self-service enterprise application store, which provides access to a global, cross-platform, software distribution network for multiple service offerings, accessible through any web browser such as Microsoft Internet Explorer, Mozilla Firefox, Google Chrome, and the like. In embodiments such an enterprise application store can be used to drive virtual desktop installations, provision enterprise server systems, connect to SaaS solutions, and integrate with custom, third-party software and services and the like. In embodiments such an enterprise application store can provide a full range of services to manage and monitor the provisioning of services. The services could be a wide range of service required by enterprises, such as software publishing and ordering, order approval, license management, chargeback and invoicing, integration with a global marketplace, and the like. The service offerings could be infrastructure as a service (IaaS), platform as a service (PaaS), and software as a service (SaaS) offerings, and the like. In further embodiments, the service offerings could be internal services, open source services, third party services, and the like. In other further embodiments, the present invention may provide for a single sign-on capability for each of the service offerings.

The application store software publishing capability can include tools to package and publish software and services to the application store, such as to allow a customer of services from the application store to develop its own software and publish its own service, which in turn can be made available through the application store. For example, a service builder could obtain from the enterprise application store a set of services that provide storage capability and that retrieve a given set of input data, such as from various sources. The service builder can then build its own service by adding a processing service that processes the inputs into outputs that are stored in the data storage and made available for other users who wish to have those outputs, such as for their own services. The new service can be stored in the enterprise application store for further use by others. A user of the enterprise application store may organize software services into manageable "catalogs" to control user access and experience, apply rich security, usage, and billing policies to entire catalogs, catalogs of catalogs, individual offerings, configure workflows for publishing approvals, and the like.

The application store software ordering capability can include an intuitive interface for browsing and purchasing published software and services, allow a user to purchase software and services for itself or on behalf of an entire group of users, schedule deployments upon purchase or for a date in the future, and the like. In other embodiments, the software ordering capability can include a customizable user interface, which allows a user to build browsing and ordering interface widgets customized to the needs of the user and then make those widgets available to the user's users through the application store.

The software application store order approval capability can include an integrated purchase approval system that follows a flexible workflow that is consistent with industry standards and best practices, a pluggable service model to allow for transparent integration with third-party approval systems, and the like. In other embodiments the order approval capability includes a highly customizable workflow that can be built from individual approval systems that can be chained-together in various and selectable sequences. These various and selectable sequences can be varied by catalog, catalog item, user, user group, and the like.

In embodiments, the ordering and approval capabilities may be filtered or otherwise limited by the user who is placing the order and/or the application on whose behalf the order is being placed. Results made available to a user and/or an application may be pre-filtered to only show those services that are available to that user and/or application. The user can be categorized by its role in the organization, or the like. The application can be categorized by its role, function, assigned policies, and the like.

The license management capability can include the creation of detailed licensing polices for individual software modules and services, a component model to allow for integration with a wide range of vendor licensing servers, runtime license checking when used with virtual machine instances managed by the present invention, and the like.

The chargeback and invoicing capability can include an integrated change management service with a configurable workflow, an adapter model allowing for integration with existing financial and asset management systems, flexible pricing policies to allow for the establishment of one-time charges or variable, usage based models, detailed organization modeling to allow for the distribution of cost across multiple cost centers, a flexible API that allows for the customization of the billing workflow, and the like. For example, invoices could be posted directly to the enterprise's enterprise resource planning (ERP) or payables system. In other embodiments, the present invention provides for the ability to report chargeback and invoicing information to both the user of the service and the provider of the service from the software application store.

The capability to be integrated with a global marketplace can include publish and subscribe access to an open market of verified software, an integrated and stringent approval process of all submissions, access to a free catalog of packaged and open-source solutions, the ability of a user to package and upload its custom solutions for exposure to a global market, the ability of a user to offer its software free or through a licensing/pricing model with automated chargeback, defined by the user, and the like.

In embodiments of the present invention, the software application store supports the recursive publishing of applications. The recursive publishing could include multiple iterations of an application published by multiple users, groups of users, enterprises, departments within enterprises, and the like. For example, a first department of a first enterprise could publish a first IaaS application back into the software application store, a second department of the first enterprise could then publish a PaaS application on top of the IaaS application published by the first department, and a third department of the first enterprise could purchase the PaaS built on top of the IaaS application and the license fees paid by the third department would be split between the first and second departments.

In embodiments of the present invention, the data may be associated with the content available in the software application store is and SKU, policy, SKU-Policy, catalog, and the like. An SKU is the primary entity describing content available through the software application store and is a pure virtual entity describing a potentially addressable software component or interaction. An interaction can be a module, service, or the like. An SKU can be defined as a software module or a service binding. A software model represents and offering comprised of one or more physical software components, which can include source code, binaries, and the like, and the software module encapsulates the information needed to resolve binaries to locations on the shared filesystem, resolve binary dependencies, locate and provision associated software packages, and the like. A service binding models a software-as-a-service (SaaS) type offering and encapsulates the information needed to configure user-access to services, authenticate, bind to services, and the like. A policy will be applied as defined by standard policy types, resolved, and applied by modules as described elsewhere in this disclosure. In other embodiments, additional policy types and definitions, with possible extensions to existing models, may be added to support the software application store. An SKU-Policy is the collection of policies associated with a given SKU and is an extensible set of required or optional policies, which may be conditionally applied. A catalog is a collection of SKU's, filtered through access control, which can be applied at any level and made available to a group of users. In further embodiments access control can be used to introduce further groupings below the root level. A given catalog instance is a rule-based expression of the root catalog. The root catalog is defined as the base set of SKU data available to all subscribers. All SKU's published in the root catalog are "inherited" by all derived catalogs. For example, the basic catalog hierarchy can be root catalog→customer catalog→user catalog.

Figure 13:
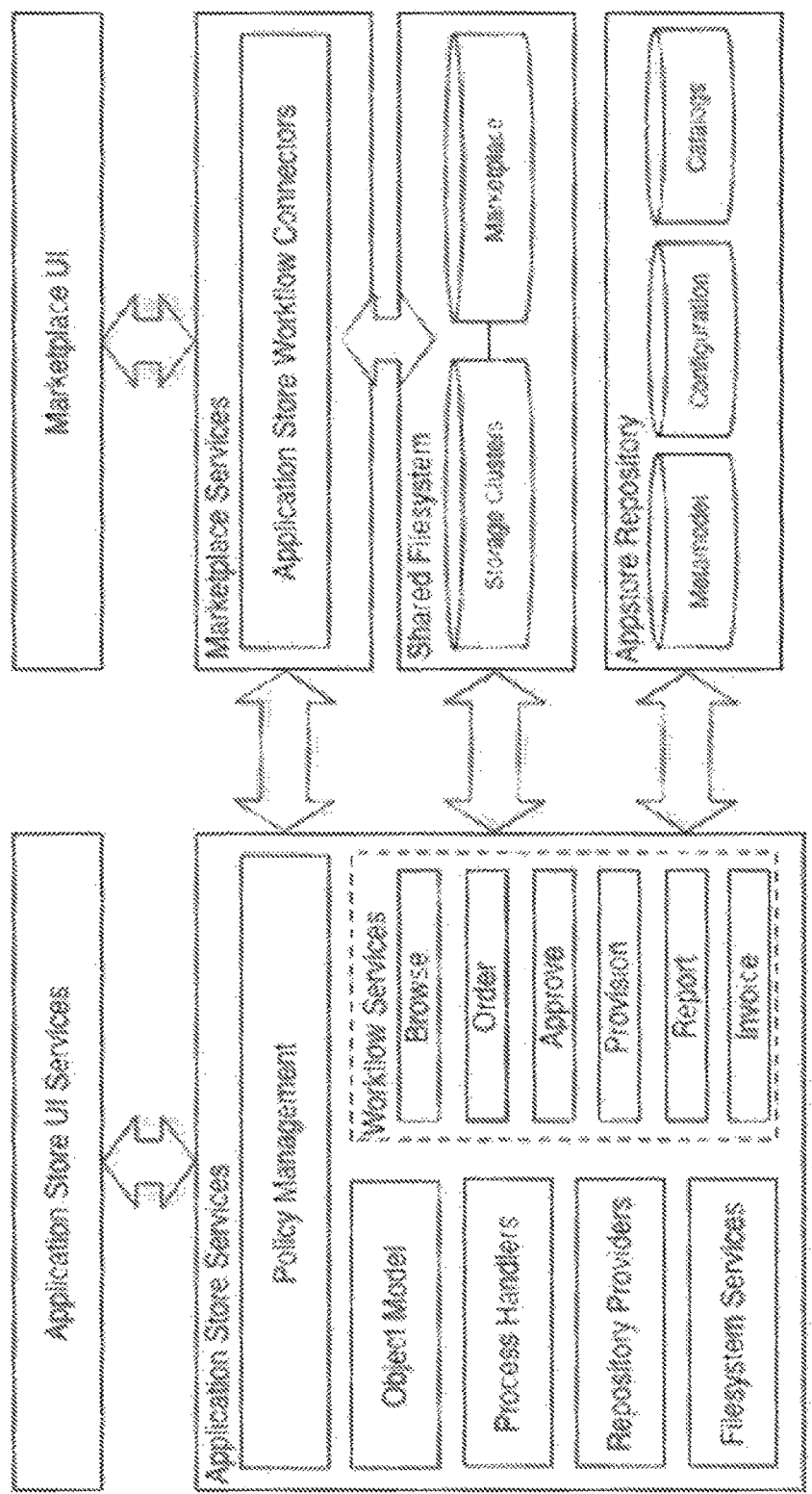
FIG. 13 is a diagram illustrating an embodiment for a self-service enterprise application store.
Figure 14:
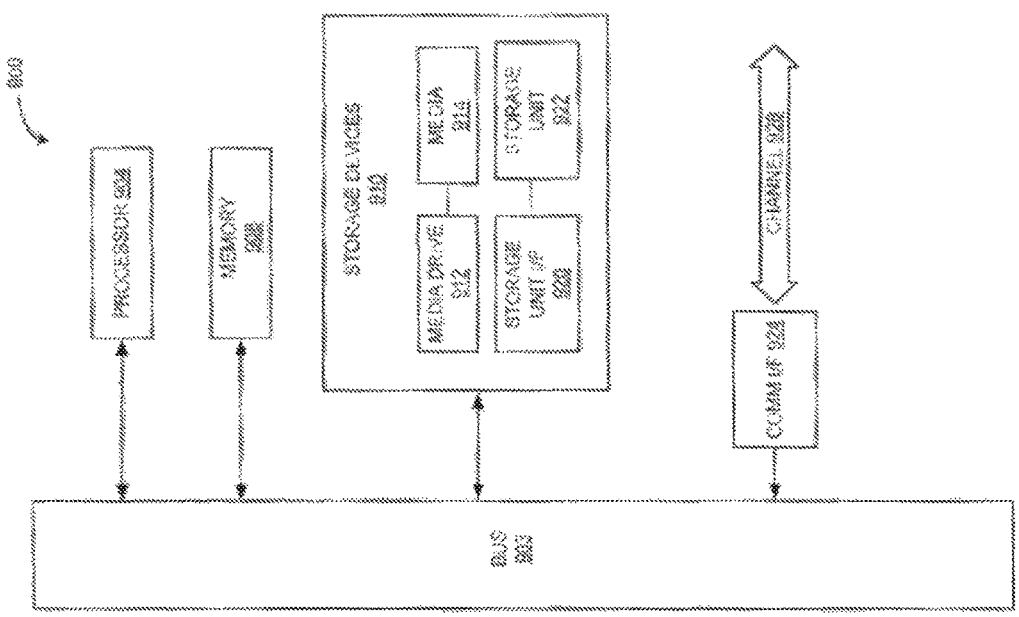
FIG. 14 is a diagram illustrating an example of a computing module for implementing various embodiments of the invention.

FIG. 13 depicts an embodiment of a software application store and marketplace interaction structure, such as with software application store services, including policy management, object models, process handlers, repository providers, filesystem services and workflow services, interfacing with marketplace services, such as with software application store workflow connectors, a shared filesystem, a software application store repository, and the like. The components could be a marketplace, shared filesystem, filesystem client, server components, repository, user interface, and the like. The marketplace is the central "public' repository that hosts the components listed in the root catalog, consists of a cluster of servers hosting a portion of the shared filesystem and a subset of the software application workflow components to manage publishing, approvals, and browsing. The marketplace may have its own basic user interface consisting of a few simple web pages, which provide access to the functionality of the software application interface. The shared filesystem may be a clustered, parallel filesystem housing all the physical components needed by the software application store and its offerings. The filesystem maybe self-contained and maybe used outside of the software application store or the system of the present invention. For example, marketplace catalog items can be hosted on the shared filesystem. The software application store may offer service components that simplify filesystem administration tasks and serve to isolate other components from the physical filesystem implementation. The filesystem client may be a client that accesses the software application store shared filesystem namespace using local filesystem semantics. For example, the namespace root may appear to the user as a local mount point or network mapped drive. In other embodiments, a number of client-side components may be installed to provide access to the software application store shared filesystem through the filesystem client. The present invention requires at least one client package for each target operating system and/or distribution. The filesystem client components are distributed through standard packages of the present invention that contain the scripts and attachment necessary to establish connectivity to the software application store shared filesystem through the filesystem client. The server components may be the core applications of the software application store and include the base object model, workflow processing components, catalog and metamodel access providers, unique policy definitions, and the like. The repository may be the collection of data structures housing the software application store metamodel, configuration, and catalog data, and the like; and are internal to the software application store. The user interface may be the collection of interface elements used to access software application store functionality and is implemented as a completely separate application that integrates with the main user interface of the present invention, describe elsewhere in this disclosure. In further embodiments, the software application store may make available shareable widgets that are an extension of the software application store user interface.

In other further embodiments, the software application store includes the capabilities to display lists of applications, application ratings, application reviews, other social features, and the like.

The term tool can be used to refer to any apparatus configured to perform a recited function. For example, tools can include a collection of one or more modules and can also be comprised of hardware, software or a combination thereof. Thus, for example, a tool can be a collection of one or more software modules, hardware modules, software/hardware modules or any combination or permutation thereof. As another example, a tool can be a computing device or other appliance on which software runs or in which hardware is implemented.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 10. Various embodiments are described in terms of this example-computing module 900. After reading this description, it will become apparent to a person skilled in the relevant art how to implement the invention using other computing modules or architectures.

Referring now to FIG. 10, computing module 900 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 900 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 900 might include, for example, one or more processors, controllers, control modules, or other processing devices, such as a processor 904. Processor 904 might be implemented using a general-purpose or special-purpose processing engine such as, for example, a microprocessor, controller, or other control logic. In the illustrated example, processor 904 is connected to a bus 902, although any communication medium can be used to facilitate interaction with other components of computing module 900 or to communicate externally.

Computing module 900 might also include one or more memory modules, simply referred to herein as main memory 908. For example, preferably random access memory (RAM) or other dynamic memory, might be used for storing information and instructions to be executed by processor 904. Main memory 908 might also be used for storing temporary variables or other intermediate information during execution of instructions to be executed by processor 904. Computing module 900 might likewise include a read only memory ("ROM") or other static storage device coupled to bus 902 for storing static information and instructions for processor 904.

The computing module 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a floppy disk drive, a magnetic tape drive, an optical disk drive, a CD or DVD drive (R or RW), or other removable or fixed media drive might be provided. Accordingly, storage media 914 might include, for example, a hard disk, a floppy disk, magnetic tape, cartridge, optical disk, a CD or DVD, or other fixed or removable medium that is read by, written to or accessed by media drive 912. As these examples illustrate, the storage media 914 can include a computer usable storage medium having stored therein computer software or data.

In alternative embodiments, information storage mechanism 910 might include other similar instrumentalities for allowing computer programs or other instructions or data to be loaded into computing module 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory module) and memory slot, a PCMCIA slot and card, and other fixed or removable storage units 922 and interfaces 920 that allow software and data to be transferred from the storage unit 922 to computing module 900.

Computing module 900 might also include a communications interface 924. Communications interface 924 might be used to allow software and data to be transferred between computing module 900 and external devices. Examples of communications interface 924 might include a modem or softmodem, a network interface (such as an Ethernet, network interface card, WiMedia, IEEE 802.XX or other interface), a communications port (such as for example, a USB port, IRport, RS232 port Bluetooth® interface, or other port), or other communications interface. Software and data transferred via communications interface 924 might typically be carried on signals, which can be electronic, electromagnetic (which includes optical) or other signals capable of being exchanged by a given communications interface 924. These signals might be provided to communications interface 924 via a channel 928. This channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 908, storage unit 920, media 914, and channel 928. These and other various forms of computer program media or computer usable media may be involved in carrying one or more sequences of one or more instructions to a processing device for execution. Such instructions embodied on the medium, are generally referred to as "computer program code" or a "computer program product" (which maybe grouped in the form of computer programs or other groupings). When executed, such instructions might enable the computing module 900 to perform features or functions of the present invention as discussed herein.

As noted throughout, organizations are increasingly leveraging hybrid cloud environments that span multiple internal private clouds, external hosted clouds, public infrastructure-as-a-service (IaaS), and/or platform-as-a-service (PaaS). The ability to deploy complex multi-tier workloads into these heterogeneous multi-vendor environments may require a meta-scheduler of the above-discussed metamodel that can place workloads to achieve the best price, performance, and service levels, while providing governance and controls around security and compliance. As such, the "meta-scheduler" may comprise an extension to the policy and governance models discussed herein.

In the known art, users may consume cloud-based IT resources using a self-service portal (also referred to as a "service catalog"). Typically, self-service portal resources are categorized as the aforementioned infrastructure-as-a-service (IaaS), platform-as-a-service (PaaS), or software-as-a-service (SaaS). The primary difference between IaaS, PaaS, and SaaS is the "completeness" of the resource. IaaS delivers low-level operating system instances. PaaS delivers a larger middle-ware environment, suitable for deploying application code. SaaS delivers high-level, full-featured, ready-to-use applications.

Higher-level offerings can be built on lower-level offerings. For instance, one can build a PaaS offering by starting with IaaS resources and then adding and configuring middle-ware software. Similarly, SaaS applications can be built on a PaaS offering.

However, self-service portals typically operate in a very restricted fashion, with very few people who create offerings and a large number of people that consume offerings. This is fine for simplistic needs, but artificially restricts innovation.

Figure 15:
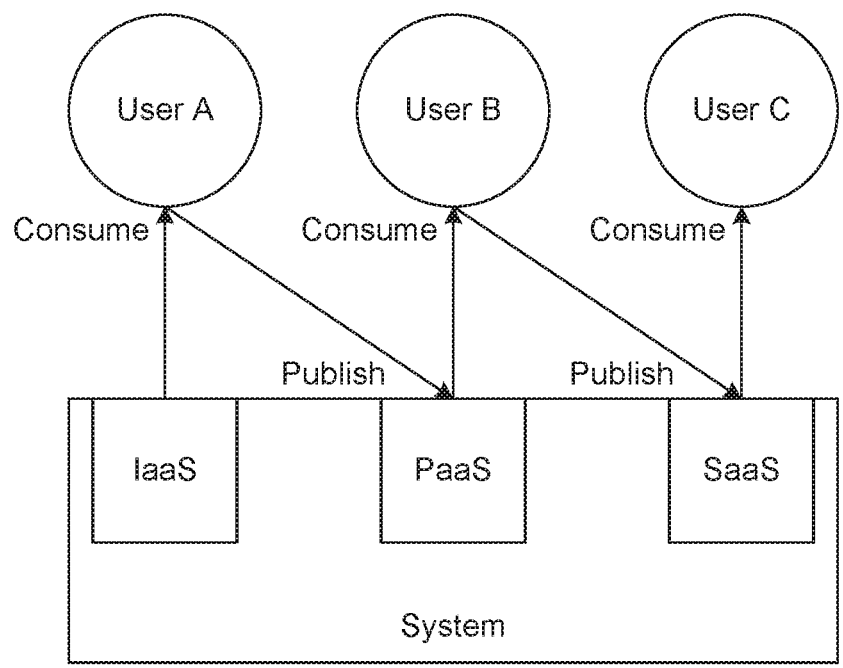
FIGS. 15-17 are illustrative user interfaces in accordance with the invention.
Figure 16:
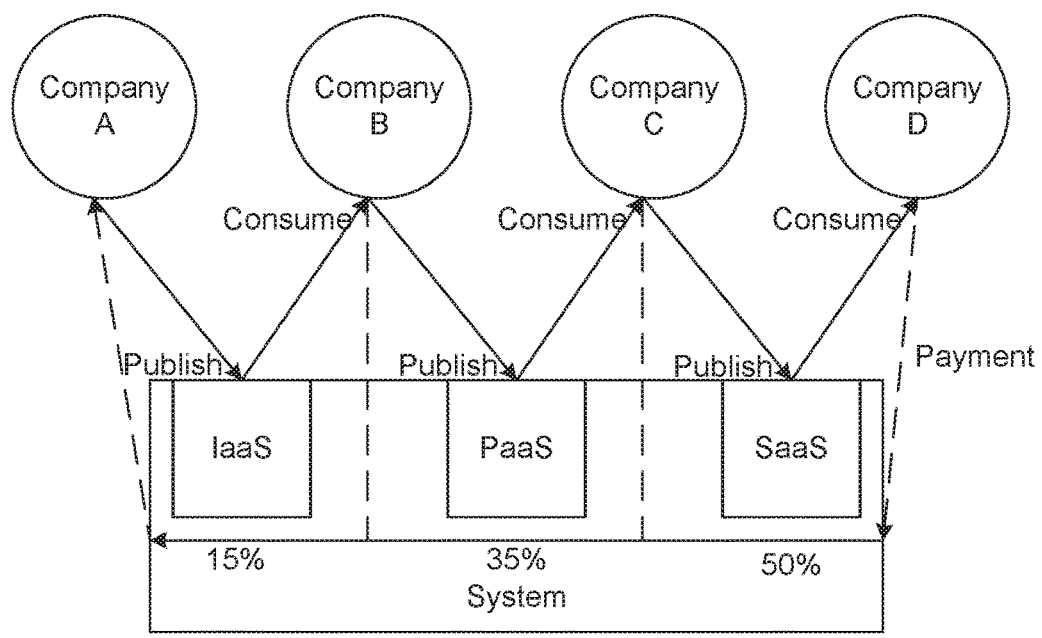
Figure 17:
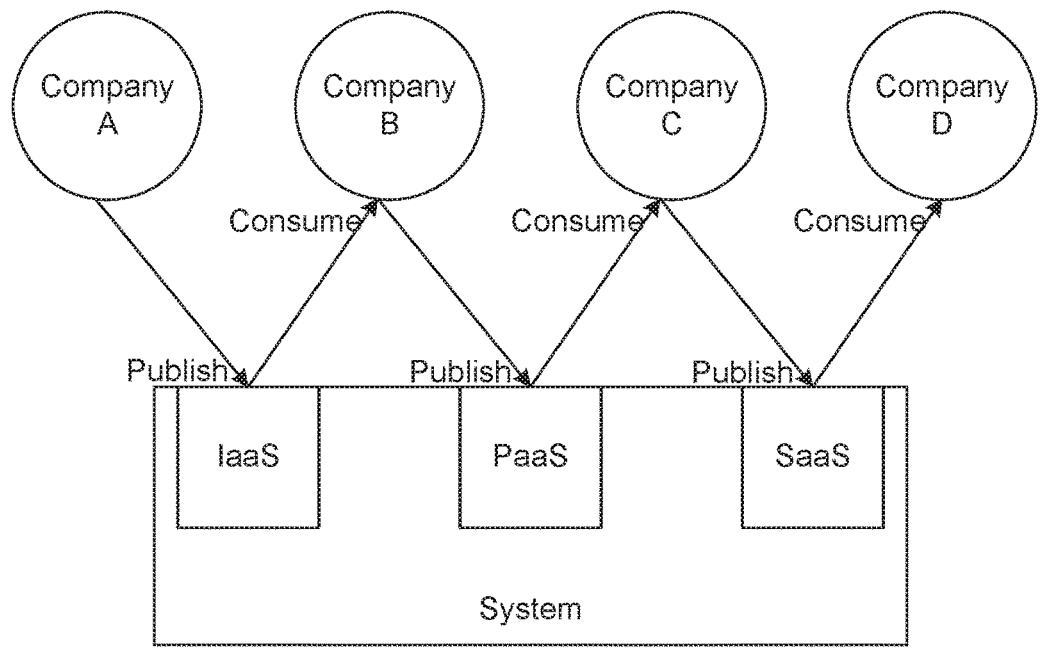

Consequently, and now with reference to FIGS. 15-17, embodiments of the present invention provide a self-service portal that allows the layered creation of offerings by a large majority of users. Thus, through the use of embodiments of the instant invention, a user may find and consume a low-level IaaS offering, and may use it to build a PaaS offering by adding and configuring middle-ware software components. That PaaS offering may then be "republished" back into the self-service portal for consumption by others. Further, a PaaS offering (including a new PaaS offering based on the IaaS offering, as just described) may be consumed, and then may be used to create a SaaS offering, which may then be republished back into the portal.

Oftentimes, the consumption of low-level services and republishing of higher-level services built thereupon will occur within a single enterprise. For instance, the IT department might create a standard PaaS offering for application developers using IaaS resources.

However, the consumption and republishing may occur between different organizations using a global self-service portal. For instance, Company A may offer IaaS in the service catalog associated with the self service portal. Company B may consume the IaaS and may use it to create a PaaS offering, which may then be offered back to the service catalog. Company C may then consume Company B's PaaS and may use it to create a SaaS offering. Company D may then consume the SaaS. Of note, intermediate levels may be skipped in such embodiments. That is, IaaS may be used directly to create SaaS, for instance, without needing a PaaS intermediary.

Of course, those skilled in the pertinent arts will appreciate in light of the discussion herein, that money (real or internal enterprise budgets) may flow between the various publishers. For instance, consumption of an IaaS resource may "cost" a given amount. A PaaS creator may consider those costs as "cost of goods sold" and price that creator's PaaS offering to cover those costs. A SaaS creator might then do the same with PaaS or IaaS costs, as appropriate. When services are consumed at any level, the self-service portal would correctly handle the payment of "money" to all the parties involved.

As such, embodiments of the present invention provide a self-service portal with the ability to "republish" at different levels. Further, provided is the capability to chain the republishing steps together (IaaS→PaaS→SaaS), such as with multiple republishing steps. The subject self-service portal may allow for consumption at different levels (IaaS, PaaS, and SaaS), and is operable between multiple entities (i.e., different departments, different corporate entities) to allow for the referenced republishing. Moreover, the self-service portal of the invention allows for the handling of money-flow between all the parties in a single or multi-party chain of publishers.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning at least one, one or more or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While the invention has been described in connection with certain preferred embodiments, other embodiments would be understood by one of ordinary skill in the art and are encompassed herein.

The methods and systems described herein maybe deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions maybe stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps maybe adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, maybe realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

What is claimed is:

1. A method comprising:
receiving, by a computing system, low-level cloud computing resources for delivering one or more operating system instances provided by a service catalog of an electronic storefront via a network infrastructure for access through an interface, the low-level cloud computing resources associated with at least one first entity;
constructing, by the computing system, mid-level cloud computing resources based at least in part on one or more middle-ware components added to the low-level cloud computing resources and provided by the service catalog at the electronic storefront via the network infrastructure for access through the interface, the mid-level cloud computing resources associated with at least one second entity;
constructing, by the computing system, high-level cloud computing resources as applications based at least in part on at least one of the mid-level cloud computing resources and the low-level cloud computing resources and provided by the service catalog at the electronic storefront via the network infrastructure for access through the interface, the high-level cloud computing resources associated with at least one third entity;
handling, by the computing system, a payment between the at least one second entity and the at least one third entity, wherein the amount of the payment includes a cost of the low-level cloud computing resources;
defining, by the computing system, a security zone including a cloud computing resource comprising at least one of the low-level cloud computing resources, the mid-level cloud computing resources, and the high-level cloud computing resources; and
automatically applying, by the computing system, a security policy to the cloud computing resource when the cloud computing resource is deployed within the security zone;
wherein the at least one first entity, the at least one second entity, and the at least one third entity are different organizations.

2. The method of claim 1, wherein the low-level cloud computing resources comprise cloud computing resources associated with infrastructure as a service (IaaS) offerings, the mid-level cloud computing resources comprise cloud computing resources associated with platform as a service (PaaS) offerings, and the high-level cloud computing resources comprise cloud computing resources associated with software as a service (SaaS) offerings.

3. The method of claim 1, wherein the network infrastructure comprises at least one of a computing device, a server, a client, a router, a hub, a firewall, a personal computer, a communication device, a routing device, an active device, or a passive device.

4. The method of claim 1, wherein the at least one first entity, the at least one second entity, and the at least one third entity are included within a single enterprise.

5. The method of claim 1, wherein the high-level cloud computing resources are not based on the mid-level cloud computing resources.

6. The method of claim 1, further comprising:
providing access to the high-level cloud computing resources to at least one fourth entity.

7. The method of claim 1, wherein the at least one first entity, the at least one second entity, and the at least one third entity configure their associated cloud computing resources.

8. The method of claim 1, wherein the interface is associated with a self-service portal.

9. The method of claim 8, wherein the self-service portal handles payments to the at least one first entity, the at least one second entity, and the at least one third entity.

10. A system comprising:
   at least one processor; and
   a memory storing instructions that, when executed by the at least one processor, cause the system to perform:
   receiving low-level cloud computing resources for delivering one or more operating system instances provided by a service catalog of an electronic storefront via a network infrastructure for access through an interface, the low-level cloud computing resources associated with at least one first entity;
   constructing mid-level cloud computing resources based at least in part on one or more middle-ware components added to the low-level cloud computing resources and provided by the service catalog at the electronic storefront via the network infrastructure for access through the interface, the mid-level cloud computing resources associated with at least one second entity;
   constructing high-level cloud computing resources as applications based at least in part on at least one of the mid-level cloud computing resources and the low-level cloud computing resources and provided by the service catalog at the electronic storefront via the network infrastructure for access through the interface, the high-level cloud computing resources associated with at least one third entity;
   handling, by the computing system, a payment between the at least one second entity and the at least one third entity, wherein the amount of the payment includes a cost of the low-level cloud computing resources;
   defining, by the computing system, a security zone including a cloud computing resource comprising at least one of the low-level cloud computing resources, the mid-level cloud computing resources, and the high-level cloud computing resources; and
   automatically applying, by the computing system, a security policy to the cloud computing resource when the cloud computing resource is deployed within the security zone;
   wherein the at least one first entity, the at least one second entity, and the at least one third entity are different organizations.

11. The system of claim 10, wherein the low-level cloud computing resources comprise cloud computing resources associated with infrastructure as a service (IaaS) offerings, the mid-level cloud computing resources comprise cloud computing resources associated with platform as a service (PaaS) offerings, and the high-level cloud computing resources comprise cloud computing resources associated with software as a service (SaaS) offerings.

12. The system of claim 10, wherein the network infrastructure comprises at least one of a computing device, a server, a client, a router, a hub, a firewall, a personal computer, a communication device, a routing device, an active device, or a passive device.

13. The system of claim 10, wherein the at least one first entity, the at least one second entity, and the at least one third entity are included within a single enterprise.

14. A non-transitory computer-readable storage medium including instructions that, when executed by at least one processor of a computing system, cause the computing system to perform a method comprising:
   receiving low-level cloud computing resources for delivering one or more operating system instances provided by a service catalog of an electronic storefront via a network infrastructure for access through an interface, the low-level cloud computing resources associated with at least one first entity;
   constructing mid-level cloud computing resources based at least in part on one or more middle-ware components added to the low-level cloud computing resources and provided by the service catalog at the electronic storefront via the network infrastructure for access through the interface, the mid-level cloud computing resources associated with at least one second entity;
   constructing high-level cloud computing resources as applications based at least in part on at least one of the mid-level cloud computing resources and the low-level cloud computing resources and provided by the service catalog at the electronic storefront via the network infrastructure for access through the interface, the high-level cloud computing resources associated with at least one third entity;
   handling, by the computing system, a payment between the at least one second entity and the at least one third entity, wherein the amount of the payment includes a cost of the low-level cloud computing resources;
   defining, by the computing system, a security zone including a cloud computing resource comprising at least one of the low-level cloud computing resources, the mid-level cloud computing resources, and the high-level cloud computing resources; and
   automatically applying, by the computing system, a security policy to the cloud computing resource when the cloud computing resource is deployed within the security zone;
   wherein the at least one first entity, the at least one second entity, and the at least one third entity are different organizations.

15. The non-transitory computer-readable storage medium of claim 14, wherein the low-level cloud computing resources comprise cloud computing resources associated with infrastructure as a service (IaaS) offerings, the mid-level cloud computing resources comprise cloud computing resources associated with platform as a service (PaaS) offerings, and the high-level cloud computing resources comprise cloud computing resources associated with software as a service (SaaS) offerings.

16. The non-transitory computer-readable storage medium of claim 14, wherein the network infrastructure comprises at least one of a computing device, a server, a client, a router, a hub, a firewall, a personal computer, a communication device, a routing device, an active device, or a passive device.

17. The non-transitory computer-readable storage medium of claim 14, wherein the at least one first entity, the at least one second entity, and the at least one third entity are included within a single enterprise.

* * * * *